(12) United States Patent
Takanashi

(10) Patent No.: US 6,715,938 B2
(45) Date of Patent: Apr. 6, 2004

(54) CAMERA AND METHOD FOR CHANGING LOCK STATE OF LENS BARRIER OF A CAMERA

(75) Inventor: Tatsuo Takanashi, Hachiouji (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 10/188,397

(22) Filed: Jul. 2, 2002

(65) Prior Publication Data

US 2003/0026617 A1 Feb. 6, 2003

(30) Foreign Application Priority Data

Jul. 3, 2001 (JP) ........................................ 2001-202506

(51) Int. Cl.[7] .............................. G03B 5/02; G03B 17/00
(52) U.S. Cl. ....................................... 396/349; 396/448
(58) Field of Search ................................. 396/348, 349, 396/448, 535

(56) References Cited

U.S. PATENT DOCUMENTS

| 5,508,769 A | * | 4/1996 | Inoue et al. | 396/349 |
| 5,822,634 A | | 10/1998 | Morishita | |
| 5,822,638 A | * | 10/1998 | Yoshida et al. | 396/448 |
| 5,937,219 A | * | 8/1999 | Morishita | 396/349 |
| 6,278,846 B1 | * | 8/2001 | Kobayashi et al. | 396/348 |
| 6,450,708 B1 | * | 9/2002 | Takanashi | 396/448 |

FOREIGN PATENT DOCUMENTS

| JP | 01-131539 | 5/1989 |
| JP | 3207186 | 7/2001 |

\* cited by examiner

Primary Examiner—Christopher E Mahoney
(74) Attorney, Agent, or Firm—Straub & Pokotylo; John C. Pokotylo

(57) ABSTRACT

A barrier-attached camera which can reduce the occurrence of damage to the camera, e.g., damage, of a mechanism portion of a lens barrel due to a careless operation of a barrier, and a method of changing a lock state of the barrier, are disclosed. The camera includes a slidable barrier 2 for covering the lens barrel 3 under the retracted state to protect the lens barrel 3, and a lock member 19 for locking the movement of the barrier 2 in a closing direction. During the movement of the barrier 2 in the closing direction, the movement of the lock member 19 to a lock position is made ready, so that immediately after the barrier 2 is moved to an open position, the lock member 19 can be moved to the lock position. Consequently, the closing operation of the barrier 2 is prohibited at the time when the extraction of the lens barrel 3 is started, immediately after the barrier 2 is opened, thus preventing collision of the barrier 2 with the lens barrel.

20 Claims, 12 Drawing Sheets

(A)

(B)

-x ⟷ +x

CAMERA AND METHOD FOR CHANGING LOCK STATE OF LENS BARRIER OF A CAMERA

CROSS-REFERENCE TO RELATED APPLICATION

The present application is based upon and claims the benefit of priority from the prior Japanese Patent Application No. 2001-202506, filed Jul. 3, 2001. The entire contents of the application are incorporated herein by reference.

BACKGROUND OF THE INVENTION

1. Field of the Invention

The present invention relates to a camera having a forwardly and backwardly movable lens barrel of a photographic lens and a lens-protecting barrier (lens barrier) which can be opened and closed in front of the photographic lens.

2. Description of the Related Art

With the advancement of compact designs, recent cameras with barriers tend to be designed so that the distal ends of the lens barrels and the front faces of the camera bodies, located on the same planes when the lens barrels are retracted.

For example, Japanese Published Patent Application H01-131539 discloses a camera that has a lens barrier and a lens barrel being retractable in the camera main body.

This camera is equipped with a barrier (lens barrier) for the protection of the front part of a photographic lens. The barrier can be opened and closed in front of the lens. FIG. 20 is a cross-sectional view showing the surroundings of the lens barrel of the camera when the barrier is locked to the camera.

In FIG. 20, reference numeral 101 represents the lens barrel, reference numeral 104 represents the barrier, reference numeral 104a represents a fitting portion (lock pin cutout) formed in the barrier, reference numeral 110 represents a lock pin and reference numeral 111 represents a leaf spring. As shown in FIG. 20, when the lens barrel 101 is extracted (protruding) from the camera main body, the lock pin 110 locks the barrier 104 at an open position so as to prevent the barrier 104 from being moved in a closing direction and contacting the lens barrel 101. Consequently, when the lens barrel 101 is located at the extended position, the barrier 104 does not interfere with the lens barrel 101 even when the barrier 104 is pressed in the P direction, and thus the forward or backward movement of the lens barrel 101 is not disturbed.

In the disclosed camera, when the barrier is in the closed position, the periphery of the lower portion of the retracted lens barrel 101 presses the L-shaped portion of the lock pin 110 against the urging force (tension) of the leaf spring 111 to move the lock pin 110 down. When the barrier 104 is opened, the lens barrel 101 starts to extract from the retracted state. At a specific point of this extraction, the pressing force on the lock pin 110 by the lower flange of the lens barrel 101 is released, and the lock pin 110 is pushed out to the front side of the camera by the urging force of the leaf spring 111 and engages with the fitting portion (lock pin cutout) 104a to lock the barrier 104. As a result of the described process, there is some time lag between the time at which the barrier 104 reaches to the open position and the time at which it is locked. Therefore, if an operator presses the barrier 104 in the closing direction P just after he or she opens it, the barrier 104 might move in the closing direction P and hit the lens barrel, 101 or the lens barrel 101 might touch the back surface of the barrier 104. Therefore, the mechanism described above for extracting the lens barrel 101 can cause damage by the contact between the barrier 104 and the lens barrel 101.

The present invention provides an improved mechanism for extracting and retracting lens barrels, and/or for locking and unlocking a lens barrier to avoid contact between the lens barrel and lens barrier caused by an error.

BRIEF SUMMARY OF THE INVENTION

The present invention relates to a camera equipped with a forwardly and backwardly movable photographic lens and a lens protecting barrier (lens barrier) which can be opened and closed in front of the photographic lens. The present invention has some technical features to reduce the risk of contact between the barrier and the photographic lens caused by careless operation of the camera. All the technical features may be used to implement the present invention; however, each one of the technical features has a unique merit for implementation. Consequently, it is not required to implement all the technical features of the present invention. A user of the present invention may use some or all of the technical features which are necessary in accordance with his or her situation.

In various embodiments of the present invention, the camera of the present invention may be a film camera, a digital camera, a video camera or any electronic equipment (for example, a cellular phone, a computer, PDA) having a camera installed therein.

In the present invention, a photographic lens includes a photographic lens and a lens barrel holding the photographic lens unless the photographic lens and the lens barrel are distinguishably described.

The present invention is designed to be used with a camera having a photographic lens which can be forwardly and backwardly moved along the optical axis direction of the lens system and a barrier which can cover the front face or a portion of the front face of the photographic lens when the lens is retracted. The barrier is movable between a closed position at which it covers the front face of the photographic lens or a portion of the front face and a retreated position at which it does not cover the front face of the photographic lens. The path of the photographic lens and the path of the barrier cross each other; therefore the barrier must locate at the retreated position when the photographic lens moves forward or backward and may locate at the closed position only when the photographic lens is retracted in the camera main body.

The first technical feature of the invention resides in that when the barrier is opened, the barrier is locked by using the movement of the barrier itself to the retreated position (the barrier is to be locked at least so as not to be moved in the closing direction). Specifically, the lock operation of the barrier is caused directly by the movement of the barrier to the retreated position, whereby the barrier can be quickly locked when it is moved to the retreated position. As an example to implement this lock operation, the lock member for locking the barrier may be kept under tension in the locking direction so that it can automatically and immediately lock the barrier by the urging force when the barrier comes to the retracted position, and thereby the locking operation becomes possible.

The second technical feature of the invention resides in that, in the first technical feature, the forward movement of the photographic lens is started only after the barrier lock by the lock member is accomplished. By this technical feature, even when the barrier is pressed in the closing direction during the forward movement of the photographic lens, the barrier cannot be moved in the closing direction because it has already been locked. Consequently, the contact between the barrier and the photographic lens can be effectively prevented. As an example to achieve this feature, a switch is provided to detect that the barrier has reached the position where it is to be locked, and the detection makes a motor start to drive the photographic lens in advancing direction.

The third technical feature of the invention resides in that, in a phase of retracting the photographic lens into the camera main body and subsequently closing the lens barrier, the lock of the barrier is released by using the retracting motion of the photographic lens. With this feature, the timing for releasing the barrier's lock can be preferably chosen in connection with the retracting photographic lens's current position. The releasing timing can be chosen with reference to the photographic lens's position, thereby it is possible to defer the release of the barrier's lock until after the photographic lens has sufficiently retracted. Thus there is no possibility of contact between the barrier and the photographic lens with respect to each other, even if the barrier is pushed in the closing direction. As an example to achieve this feature, a member for releasing the barrier lock (lock-release engaging portion) is provided on the photographic lens. This member engages with the lock member during the retraction of the photographic lens, and pushes the lock member by using the retraction movement to unlock it.

The fourth technical feature of the invention resides in that, in the third technical feature, a mechanism for avoiding the engagement between the lock-release engaging portion and the lock member during the advancement of the photographic lens is adopted. The lock-release engaging portion which engages with the lock member during retraction of the photographic lens may also engage with the lock member during advancement of the photographic lens, because the photographic lens usually advances and retracts along the same path. The lock-release engaging portion is intended to operate only in the retracting movement of the photographic lens, thus the engagement in the advancing movement of the photographic lens may cause some unexpected problems. This mechanism is provided to avoid the problems. As an example to achieve this feature, a slant surfaces are provided on the surfaces, onto which the lock-release engaging portion and the lock member contact each other during the advancing movement of the photographic lens, so that the lock-release engaging portion and the lock member slide on each other along the slant surfaces during the advancing movement of photographic lens. This sliding movement applies the force in a direction different than the advancing direction of the photographic lens to the lock member, thereby the force moves the lock member out of the engaging position.

The fifth technical features of the invention resides in that the engagement of the lock-release engaging portion and the lock member is released by using the closing operation of the barrier. When the release of the lens barrier is to be made, the lock-release engaging portion engages the lock member during the retracting movement of the photographic lens. The lock-release engaging portion pushes the lock member to unlock the lens barrier by using the retracting movement of the photographic lens. But after the releasing of the lock, the lock-release engaging portion may still be engaged and push the lock member, thus the lock member can not lock the barrier again until the engagement with the lock-release engaging portion is released. Therefore, it is required to release the engagement between the lock-release engaging potion and the lock member after the unlocking of the lens barrier is accomplished. In this feature of the invention, the engagement is released by using the closing operation of the barrier. As an example to achieve this feature, it is desirable to provide a lock engaging portion on the lens barrier for engaging with the lock member during the lens barrier's closing operation. This lock engaging portion engages with the lock member, pushes it by the closing movement of the barrier, whereby the engagement between the lock member and the lock-release engaging portion is released.

The sixth technical feature of the invention resides in that, two specific positions are specified as positions of the retreated lens barrier with respect to the photographic lens' path (two positions are appointed from along the lens barrier's path in which the lens barrier is retreated from the photographic lens's path). One is a semi-open position at which the lens barrier is to be locked (to prevent motion in closing direction), and the other is an open position at which the barrier is more widely opened and is detected by a switch. The switch is used to control the driving motor of the photographic lens. When the barrier comes into the open position, it is detected with the switch, and then the photographic lens starts the forward motion from the retracted position. On the other hand, when the barrier is detached from the switch, the retracting motion of the photographic lens is started. Therefore, the driving of the photographic lens is carried out in connection with the opening and closing operation of the barrier, and it is not required to provide a button for driving the photographic lens. This is particularly effective in a case where the barrier is manually moved. With the implementation of the technical feature, there is some extra time period between the completion of the lock and the start of the forward movement of the photographic lens (this time period corresponds with the time period in which the barrier moves from the semi-open position to the open position), so that the possibility of malfunction can be reduced. Further, when the barrier is being closed, the closing operation of the barrier is temporarily stopped at the semi-open position, and the automatic retraction of the photographic lens is started. Therefore, when (by adopting the third technical feature, for example) the lock of the barrier may be released after the photographic lens is retracted to a position at which the closing operation of the barrier is not disturbed, and thus the operation can be smoothly performed while the possibility of the contact between the photographic lens and the barrier is reduced.

The switch is preferably set to detect the departure of the barrier when the barrier just reaches the semi-open position from the open position, so an operator may not notice a difference between the two positions, (the barrier locking position (the semi-open position) and the motor-controlling position (the open position)), and may enjoy a smooth operational feeling.

The switch of the second or sixth technical feature may include mechanical types, electrical types, optical types, magnetic types or any other type of sensing device or method. In one embodiment of the invention, the switch may be, for example, a photoelectric switch.

In many cameras, the photographic lenses are, at least partially, sunken into the camera main bodies when they are retracted. When in this condition, the cameras are usually disabled from taking photographs. When the photographic lenses are extended from the bodies, the cameras become to be able to take photographs. However, the present invention does not require a connection between the location of the photographic lens and the operational conditions of the camera.

BRIEF DESCRIPTION OF THE SEVERAL VIEWS OF THE DRAWINGS

FIGS. 7A and 7B are cross-sectional views taken along F—F of FIG. 6, wherein FIG. 7A shows the state of the tip of an arm portion, a driven arm and a projecting portion of a lock shaft when the barrier is located at an open position or semi-open position, and FIG. 7B shows the state of the tip of the arm portion, the driven arm and a rotation stopping projection of the lock shaft when the barrier is located at a closed position;

DETAILED DESCRIPTION OF THE INVENTION

Preferred embodiments of the present invention will be described hereunder with reference to the drawings.

Figure 1:
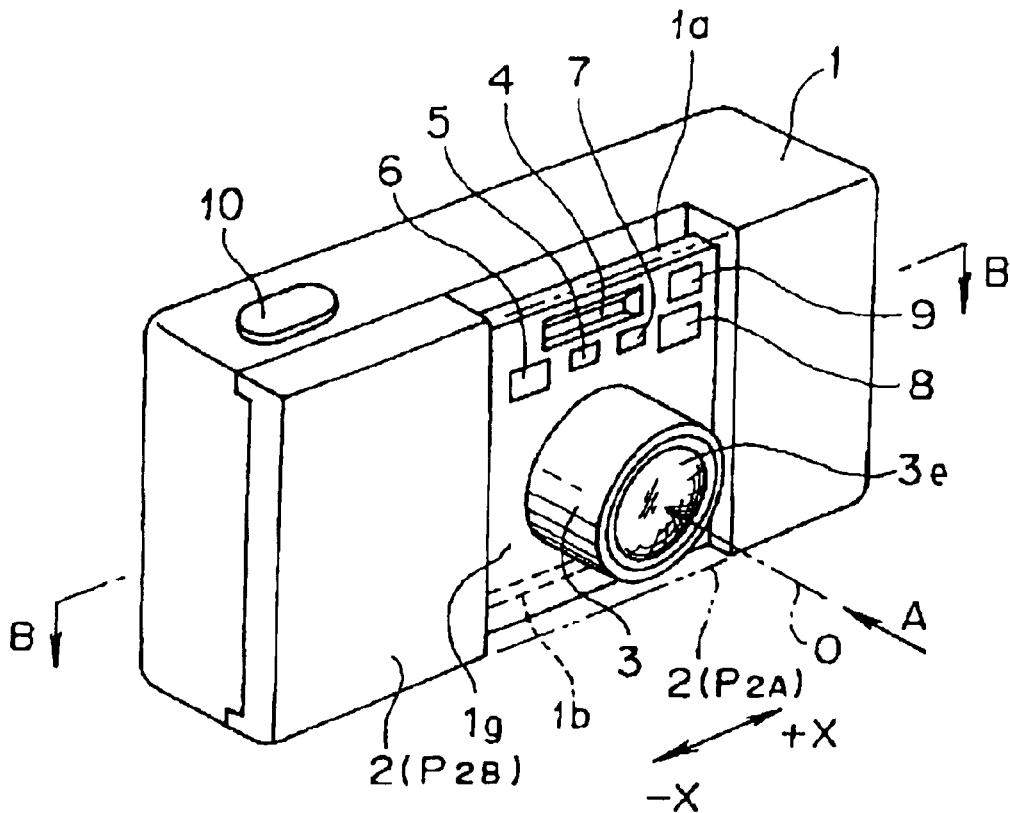
FIG. 1 is a perspective view showing a barrier-attached camera in an embodiment of the present invention when the barrier is opened.
Figure 2:
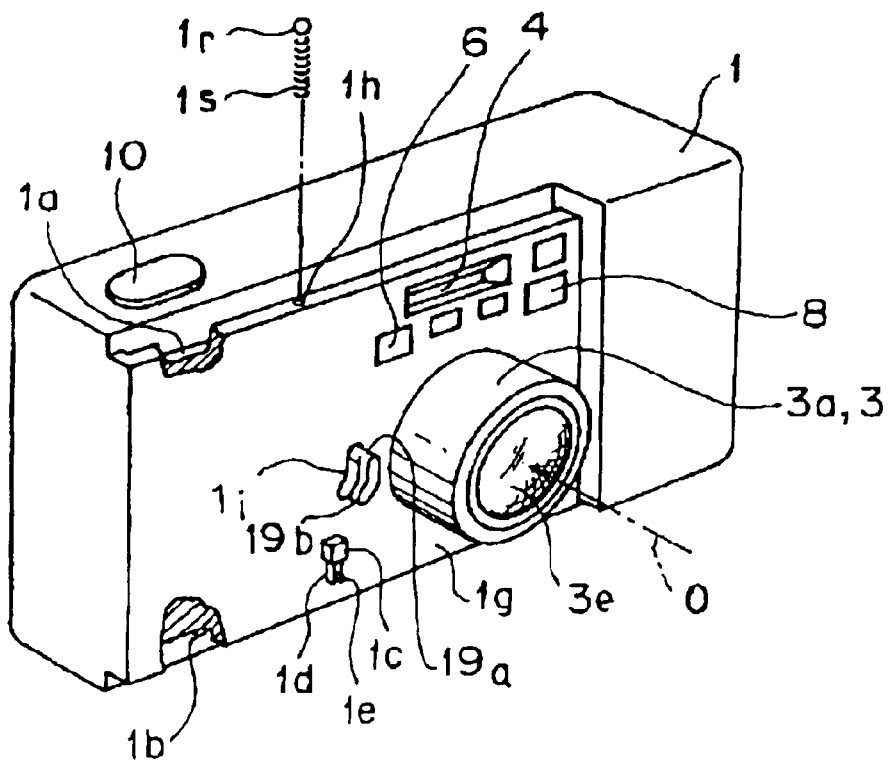
FIG. 2 is an exploded perspective view showing the camera of FIG. 1, when the camera is ready to take pictures and the barrier is omitted for illustration.
Figure 3:
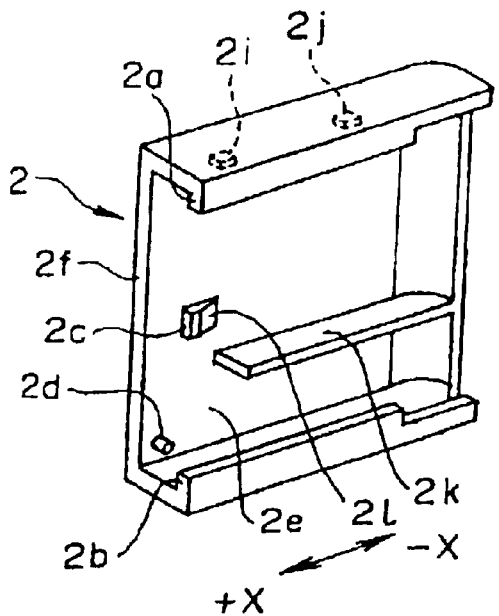
FIG. 3 is a perspective view showing the barrier mounted in the camera of FIG. 1, which is viewed from the backside of the camera, which is the opposite direction of the direction A of FIG. 1.

FIG. 1 is a perspective view showing a barrier open state of a camera with a lens barrier 2 of one embodiment employing the present invention. FIG. 2 is an exploded perspective view of the camera in a photo-taking state, omitting the barrier 2 for illustration. FIG. 3 is a perspective view of the barrier 2 of the camera, which barrier 2 is viewed from the backside, which is the opposite direction to the A direction of FIG. 1.

Figure 9:
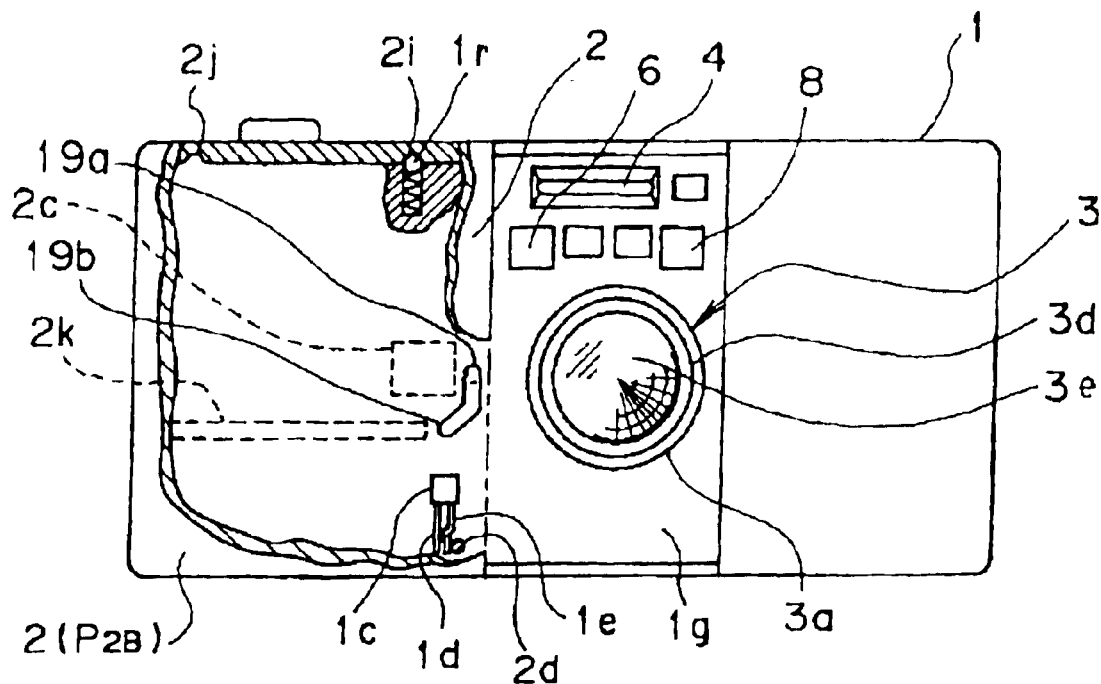
FIG. 9 is a front view taken in the A direction of FIG. 1, in which the barrier is in the open state, and the camera is ready to take pictures.
Figure 10:
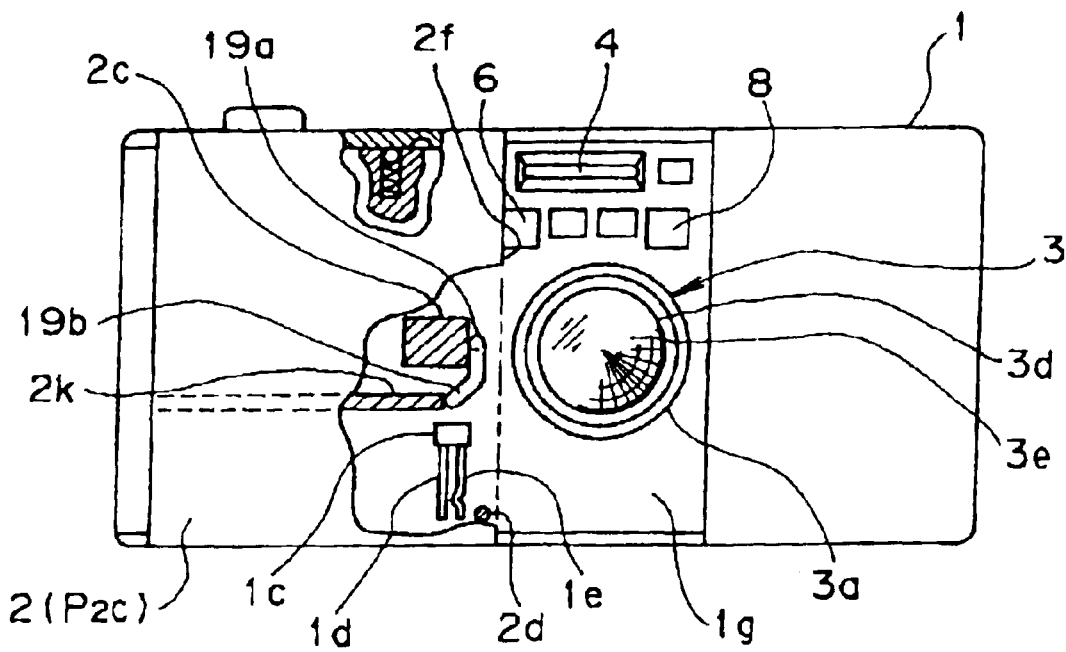
FIG. 10 is a front view taken in the A direction of FIG. 1, in which the barrier is located at the semi-open position and the lens barrel has just started retracting.
Figure 11:
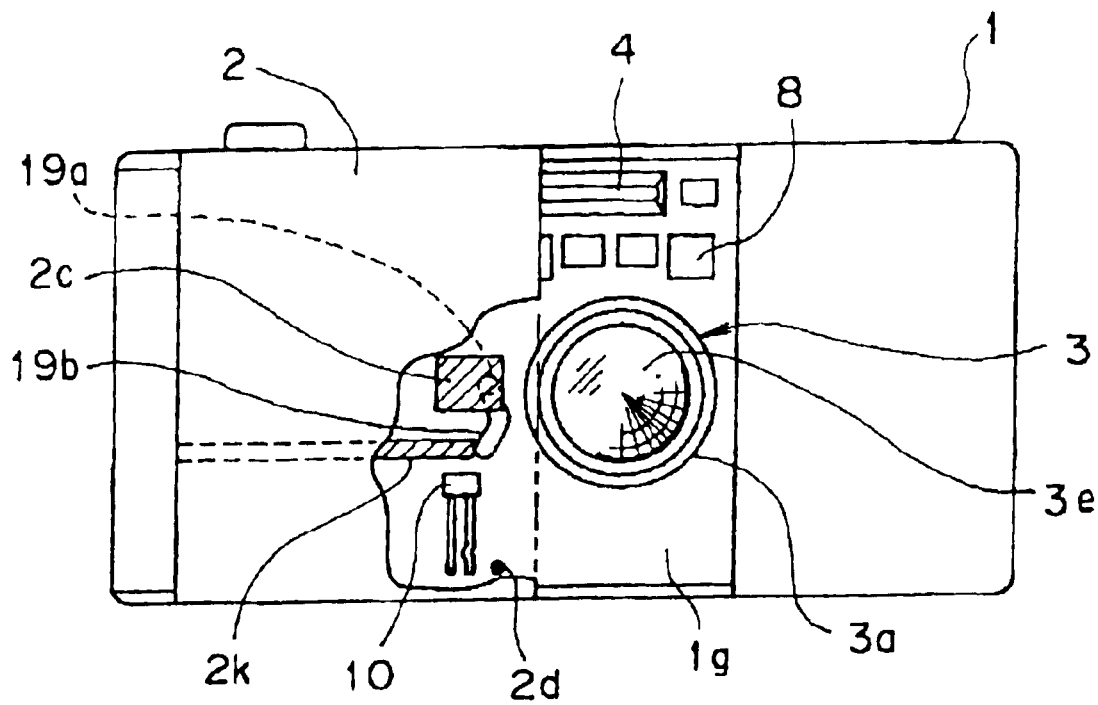
FIG. 11 is a front view taken in the A direction of FIG. 1, in which the lens barrel has retracted in the body and the barrier has further moved in the closing direction from the semi-open position.
Figure 12:
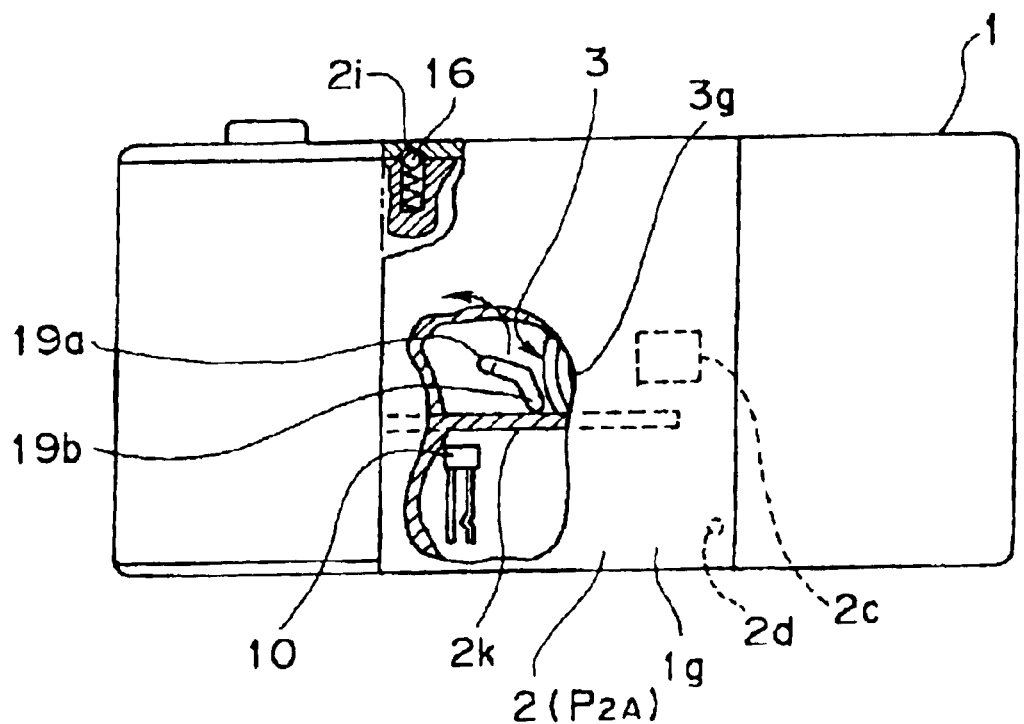
FIG. 12 is a front view taken in the A direction of FIG. 1, in which the barrier is closed.

Further, FIGS. 9 to 12 are front views of the camera, which show the open/close state of the barrier 2 viewed in the A direction of FIG. 1. FIG. 9 shows the camera in which the barrier 2 is at a open position and ready to take pictures. FIG. 10 shows the camera in which the barrier 2 is at a semi-open position and a lens barrel 3 is just starting to retract. FIG. 11 shows the camera in which the barrier 2 is in closing process after the lens barrel 3 has retracted. FIG. 12 shows the camera in which the barrier 2 has closed.

In the following description, the closing direction of the barrier 2 is referred as +X direction, and the opening direction of the barrier 2 is referred as −X direction. Further, the direction from the camera to the subject is referred as +Z direction (forward direction), and the direction from the camera lens to the film face is referred as −Z direction (backward direction). The rotational direction is indicated as the camera is viewed from the subject side.

As shown in FIG. 1, the camera with a barrier 2 of the embodiment shown has a barrier 2 disposed at a front face portion of a camera main body 1. By manually operating the barrier 2 in the +X direction or the opposite direction (−X direction), the barrier 2 is movable to the open position P2B (see FIG. 9) and the semi-open position P2C (see FIG. 10) and the closed position P2A (See FIG. 12). In the open position P2B and the semi-open position P2C, the barrier 2 is retreated from the photographic lens's path (the barrier 2 is in the retreated position. In the closed position P2A, the barrier 2 covers a photographic lens 3e located at the accommodated position (retracted position). The camera is in a non-photo-taking state when the photographic lens is located at the retracted position.

In the camera, the photograph lens barrel (hereinafter referred to as "lens barrel") 3 is forwardly or backwardly moved between the retracted position at which the camera can not take photographs and the extended position at which the camera can take photographs. This movement is related to the barrier's movement.

At the semi-open position P2C of the barrier 2, the movement of the barrier 2 in the closing direction is locked (fixed), and the retracting motion of the lens barrel 3 is started.

The barrier 2 has a movement path between the closed position and the open position at the front side of the lens barrel 3 when the lens barrel 3 is in the retracted position. The lens barrel 3 has a movement path between the extracted position and the retracted position. The moving path of the barrier 2 and the moving path of the lens barrel 3 cross each other. That is, when the lens barrel 3 is located at the retracted position, then the lens barrel 3 is out of the moving path of the barrier 2, and when the lens barrel 3 is located at the extracted position, the lens barrel 3 is located within the moving path of the barrier 3. In other words, when the barrier 2 is located at the open position, the barrier 2 is out of the moving path of the lens barrel 3, and when the barrier 2 is located at the closed position, the barrier 2 is within the moving path of the lens barrel 3.

In the camera of the above embodiment, guide grooves 1a and 1b, along which the barrier 2 is freely and slidably supported, are formed in parallel at the upper and lower portions of the front face 1g of the camera main body 1 which is an outer shell of the camera, so as to extend in the right-and-left direction as shown in FIGS. 1 to 4.

The lens barrel 3 which is slidably inserted into an opening portion 1j, (shown in FIGS. 13 to 15) is freely forwardly and backwardly movable in the direction of the optical axis O and is disposed at the center portion of the front face of the camera main body 1. Further, an electronic flash window 4, a finder window 5, a ranging photodetecting window 6, a ranging light emitting window 8, a photometric window 7, a self-timer display window 9, etc. are disposed on the camera main body in the area above the lens barrel 3.

When the barrier 2 is located at the closed position P2A, the barrier 2 covers the lens barrel 3, in the retraction state, and the elements above the lens barrel 3 previously described, e.g., the ranging photodetecting window 6 and the self-timer display window 9.

Further, a release button 10 for operating a release switch 10a (see FIG. 18) is disposed at the upper face portion of the camera main body 1.

As shown in FIG. 2, a shaft hole 1i having a bent shape is disposed on the front face 1g of the camera main body 1 at the left side of the lens barrel 3. From the shaft hole 1i, a tip portion 19a of a lock shaft 19 (serving as the lock member) including an arm portion and an arm portion tip 19b of the arm portion is projected so as to be freely rotatable and movable. Further, a barrier detecting switch 1c having contact pieces 1d, 1e for detecting the open and close state of the barrier 2 is disposed below the shaft hole 1i.

Further, a small hole 1h is disposed at the upper portion of the front face 1g of the camera main body 1. A click spring 1s and a click ball 1r for applying a click stop action to the barrier 2 are fitted in the small hole 1h.

A later-described barrier lock mechanism comprising the lock shaft 19 (including a mechanism for locking the barrier, a mechanism for preparing the barrier lock, a mechanism for moving a lock member and a mechanism for releasing the barrier lock) is provided at the side portion of the lens barrel 3 in the camera main body 1.

As shown in FIG. 3, the barrier 2 includes engaging guide portions 2a, 2b located at the upper and lower edge portions of the barrier 2, and two click recess portions 2i, 2j located on the inner surface of the upper side. Further, the barrier 2 includes a projection 2c on an inner surface 2e located near a closing side edge face 2f, a rib portion 2k extending from the lower side of the projection 2c in the -X direction (horizontal direction), and a projection 2d at the lower portion of the inner surface 2e.

The guide portions 2a, 2b are freely and slidably fitted in the guide grooves 1a, 1b of the camera main body 1, and support the barrier 2 slidably along the guide grooves 1a, 1b.

The click ball 1r, which is placed in the small hole 1h at the upper portion of the camera main body 1, is to fit into the click recess portion 2i or 2j of the barrier 2, making a click feeling, and stopping the barrier 2 at a predetermined position. When the ball 1r is fitted into the click recess portion 2i, the barrier 2 is located at the open position P2B, and when the ball 1r is fitted into the click recess portion 2j, the barrier 2 is located at the close position P2A.

When the barrier 2 is located at the open position P2B, a projection 2d presses the contact piece 1e bringing the contact piece 1e and the contact piece 1d into contact with each other, thereby turning on the barrier detecting switch 1c. Further, when the barrier 2 is moved from the open position P2B, the contact piece 1e is released and the barrier detecting switch 1c is turned off. In the camera of this embodiment, the barrier detecting switch 1c is set to be turned off just when the barrier 2 reaches the semi-open position P2C, so as to improve the operational feel. The barrier detecting switch 1c is covered by the barrier 2 irrespective of the open or closed position of the barrier 2 and thus the barrier detecting switch 1c is not exposed to the outside at any time. The projection 2c abuts against the tip portion 19a of the lock shaft 19 projecting from the camera main body 1, and locks the movement of the barrier 2 in the closing direction. The projection 2c includes a slant surface 21 which is inclined from the projected portion thereof to the inner surface 2e of the barrier 2 in the -X direction.

The rib portion 2k is a part of the mechanism for preparing the barrier lock. It may press the arm portion tip 19b of the lock shaft 19 on the end surface thereof, to rotate the lock shaft 19 in the counterclockwise direction.

Next, the arrangement around the lens barrel 3, the lens barrel driving mechanism and the barrier lock mechanism will be described in detail with reference to FIGS. 4 to 8, FIGS. 9 to 12 and FIGS. 13 to 17.

Figure 4:
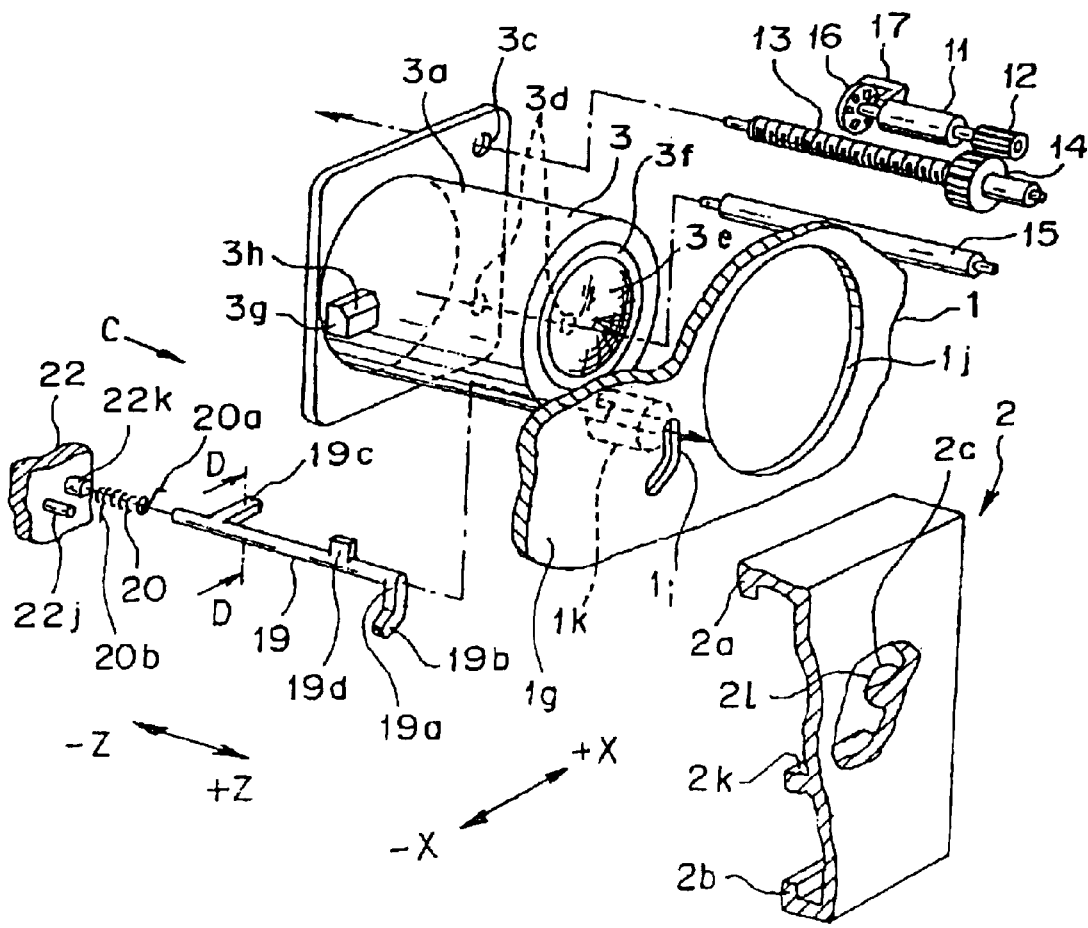
FIG. 4 is an exploded perspective view showing a lens barrel driving mechanism portion and a barrier lock mechanism portion in the camera of FIG. 1.
Figure 5:
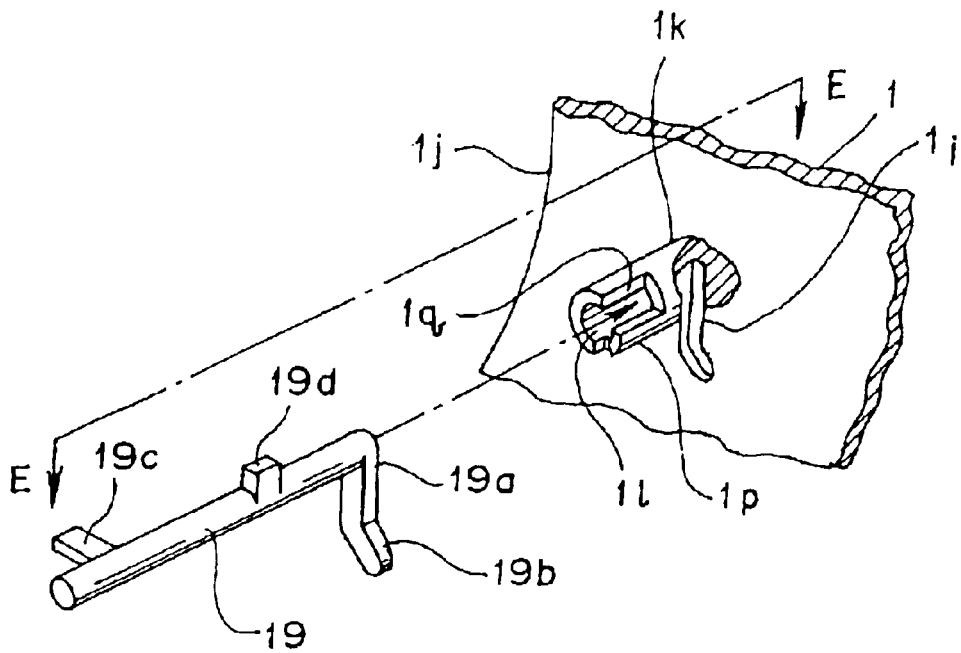
FIG. 5 is a view taken along the direction of C of FIG. 4 (exploded perspective view), which shows a part of the barrier lock mechanism portion.
Figure 6:
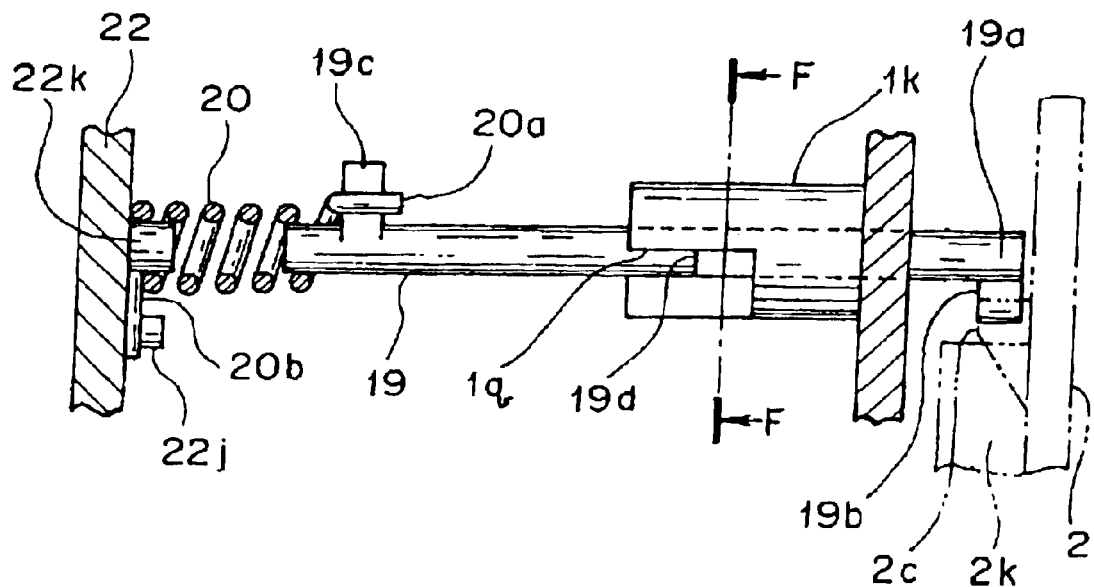
FIG. 6 is a cross-sectional view taken along E—E of FIG. 5.
Figure 7:
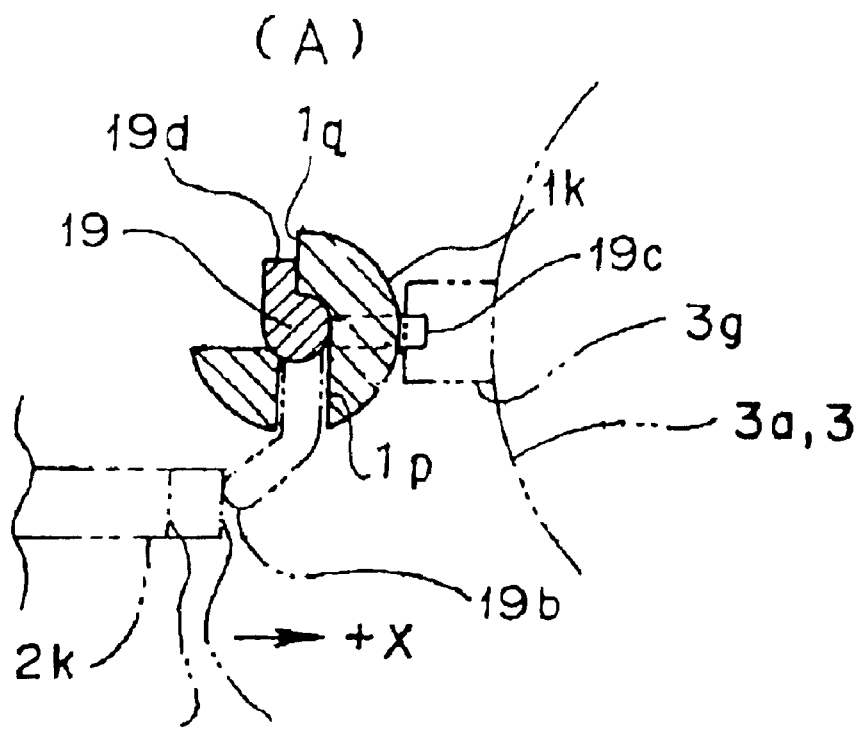
Figure 7:
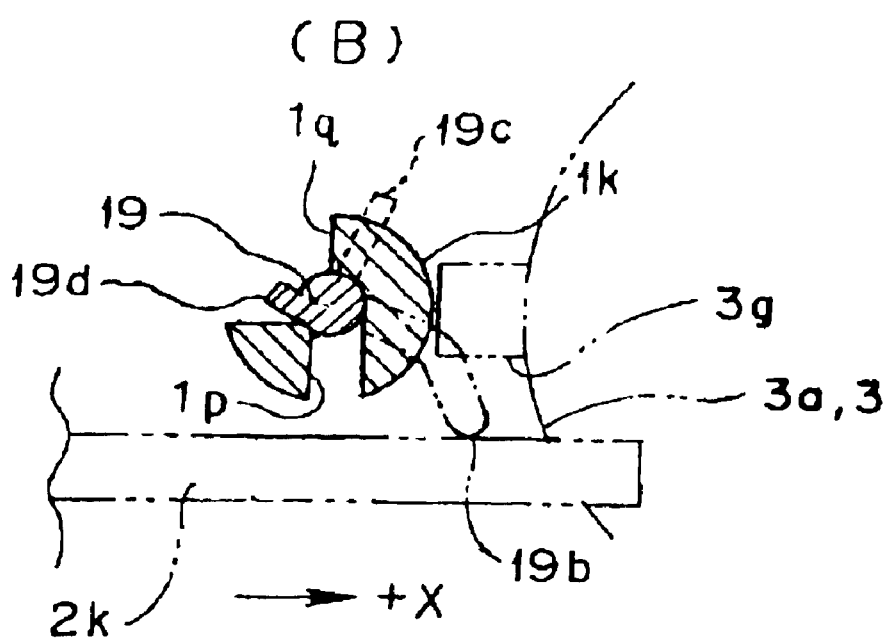
Figure 8:
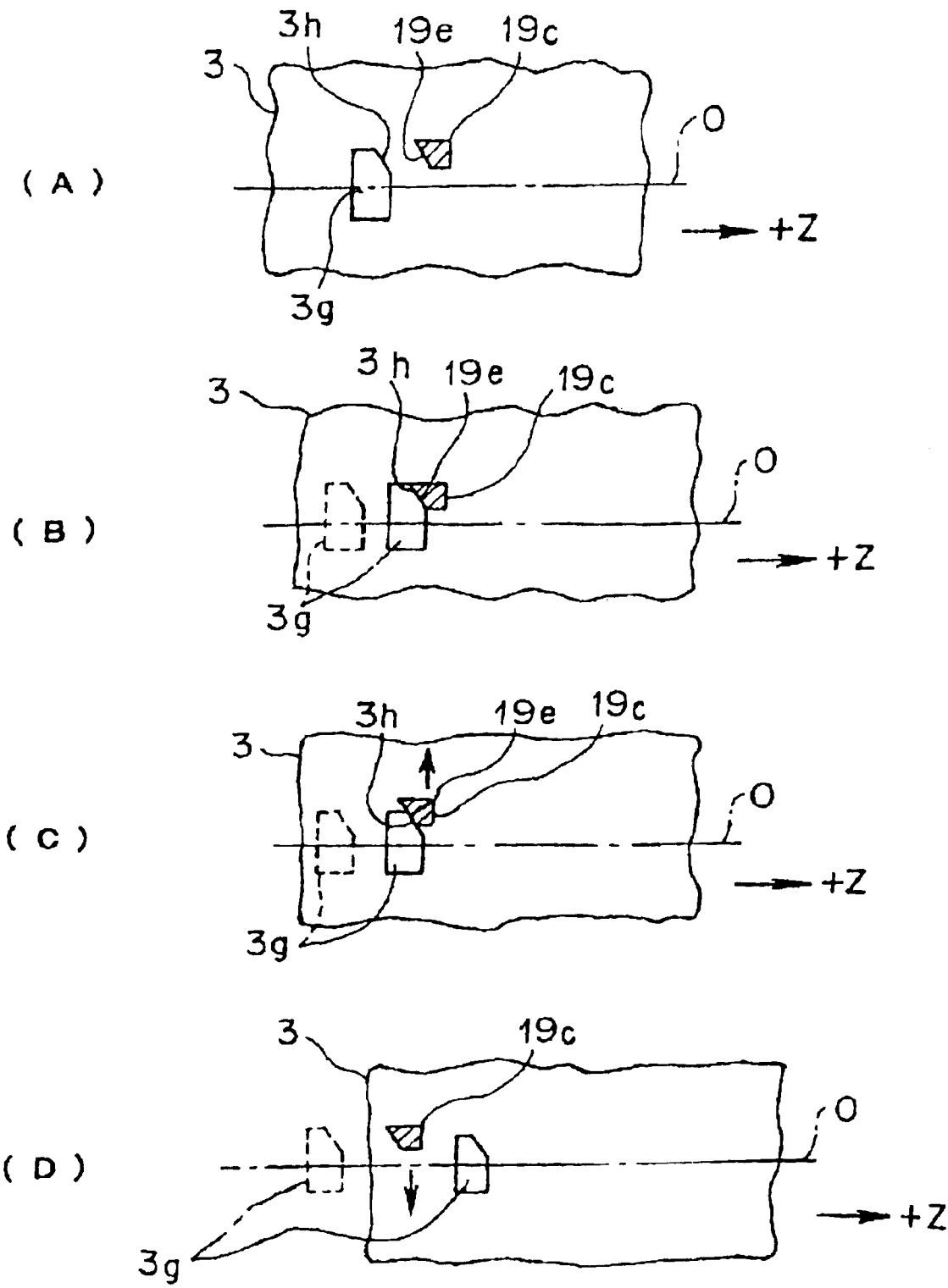
FIGS. 8A to 8D are cross-sectional views taken along D—D, which show variation of the relative positional relationship between a driving projection and the driven arm of the lock shaft when the lens barrel is extracted.
Figure 13:
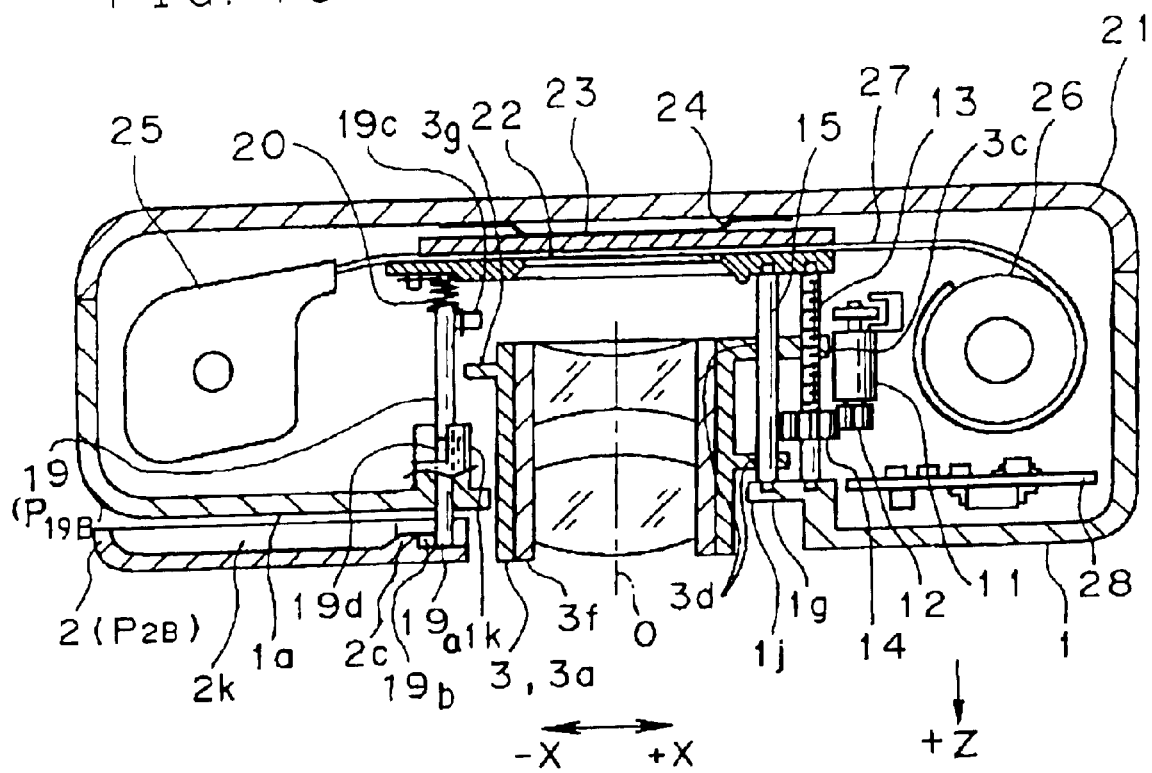
FIG. 13 is a cross-sectional view taken along B—B of FIG. 1, in which the barrier is located at the open position and the lens barrel is extended.

FIG. 4 is an exploded perspective view showing the lens barrel driving mechanism and the barrier lock mechanism. FIG. 5 is an exploded perspective view of a part of the barrier lock mechanism taken in the C direction of FIG. 4. FIG. 6 is a cross-sectional view taken along E—E of FIG. 5. FIGS. 7A and 7B are cross-sectional views taken along F—F of FIG. 6. FIG. 7A shows the state of each of an arm-portion tip 19b (described later), a driven arm portion 19c (described later) and a rotational stop projecting portion 19d (described later) of the lock shaft 19 when the barrier 2 is located at the open position P2B or semi-open position P2C. FIG. 7B shows the state of the arm-portion tip 19b, the driven arm portion 19c and the rotational stop projecting portion 19d of the lock shaft 19 when the barrier 2 is located at the closed position P2A or during the barrier closing operation. FIG. 8 is a cross-sectional view taken along D—D of FIG. 4. FIGS. 8A to 8D show variations of the relative positional relationships between a driving projection 3g (described later) and the driven arm portion 19c (described later) of the lock shaft 19 when the lens barrel 3 is extracted. FIGS. 9 to 12 are front views of the camera of this embodiment which are viewed in the A direction of FIG. 1, and FIGS. 13 to 17 are cross-sectional views of the camera of this embodiment which is taken along B—B of FIG. 1. FIGS. 9–17 show the process from the extracted state of the lens barrel 3 to the retracted state of the lens barrels. Within the camera main body 1 serving as the outer shell, and a rear cover 21, an aperture member 22 having an opening portion for a film is disposed at the rear side of the lens barrel 3 as shown in FIG. 13. A cartridge chamber in which a film cartridge 25 is put is provided at one side of the aperture member 22, and a spool chamber in which a spool 26 is put is provided at the other side of the aperture member 22.

A pressure plate 23 disposed in the back surface side of the aperture member 22 is pressed by a pressure plate spring 24. A film 27 fed from the film cartridge 25 is guided to the spool 26 through the feeding path between the aperture member 22 and the pressure plate 23. An electrical circuit board unit 28 for controlling the camera is disposed in front of the spool 26.

As shown in FIGS. 4, and FIGS. 13–17, the lens barrel 3 has a zoom moving frame 3f for holding the photographic lens 3e, and a moving frame 3a which is disposed on the outer periphery of the zoom moving frame 3f to support the zoom moving frame 3f so that the zoom moving frame 3f is forwardly and backwardly movable. The lens barrel 3 is fitted into the opening portion 1j of the camera main body 1, and supported to be freely forwardly and backwardly movable in the Z direction along the optical axis O. The lens barrel 3 is forwardly and backwardly movable between the retracted position (see FIG. 17) at which the lens barrel 3 is retracted in the camera main body 1 and the photographing standby position (or the photographing position, FIGS. 1, 13) at which the lens barrel 3 is extracted from the camera main body 1.

In the side portion of the outer periphery of the moving frame 3a, the following are included: a shaft hole 3d in which a guide shaft 15 is freely and slidably fitted, a female screw portion (threaded screw hole) 3c with which a feeding screw (shaft) 13 parallel to the guide shaft 15 is threadedly engaged, and a driving projecting portion 3g which provide a mechanism for preparing the barrier lock, a mechanism for moving the lock member and a mechanism for releasing the barrier lock.

The feeding screw (shaft) 13 and the guide shaft 15 are supported by the camera main body 1 and the aperture member 22. A gear 14 is fixed to one end of the feeding screw (shaft) 13. The gear 14 engages a pinion 12 of the output shaft of a driving motor 11. Consequently, when the driving motor 11 is rotated, the feeding screw (shaft) 13 is also rotated accordingly and the moving frame 3a of the lens barrel 3 is forwardly or backwardly driven in the Z direction along the guide shaft 15.

A slit plate 16 is fixed to the output shaft of the driving motor 11, and the rotational amount of the slit plate 16 is detected by a photointerruptor 17. The contact piece portions (not shown) of a retracted position detecting switch 34a (FIG. 18) and a photographing standby position (or photographing position) detecting switch 34b (FIG. 18) are mounted on the moving frame 3a. The forward/backward movement position of the lens barrel 3, for example, during the retraction, or when at the photographing position, is detected using a barrel position detecting encoder circuit board (not shown).

As shown in FIGS. 4–6, the barrier lock mechanism includes the lock shaft 19, an urging spring 20, a bearing portion 1k, located in the camera main body 1, the driving projecting portion 3g of the lens barrel 3, the projection 2c of the barrier 2 and the rib portion 2k of the barrier 2. The lock shaft 19 serves as the lock member. The urging spring 20, serves as an urging member and applies tension to the lock shaft 19. The bearing portion 1k provides freely and slidably support to the lock shaft 19.

The bearing portion (shaft receiving portion) 1k for supporting the lock shaft 19 of the camera main body 1 is provided on the inner surface of the body adjacent to the shaft hole portion 1i on the left side of the lens opening portion 1j so as to project in the optical axis O direction. The bearing portion (shaft receiving portion) 1k includes a shaft hole 11 in which the tip portion 19a of the lock shaft 19 is rotatably inserted, a notch 1q which determines the range of the rotational angle of the lock shaft 19 within a predetermined angle (about 90° for this particular embodiment of the invention), and a guide groove 1p in which the arm portion of the lock shaft 19 is inserted. The shaft hole 11 communicates with the shaft hole 1i disposed in the front surface 1g of the camera main body.

The lock shaft 19 has an arm portion of bent shape which projects from the tip portion 19a in the sideward direction, and the arm portion has an arm-portion tip 19b serving as the lock standby start mechanism. The lock shaft 19 is equipped with the rotation stop projecting portion 19d, and the driven arm portion 19c which projects sideward at the rear end side of the lock shaft 19 and constitutes one part of the lock release mechanism and the lock standby start mechanism.

The urging spring 20 used for applying urging tension to the lock shaft 19 is a torsion spring which can be expanded and contracted in the axial direction of the coil, and it constitutes one component of the lock standby start mechanism and the lock member moving mechanism. One end of the urging spring 20 is fitted into a spring support projection 22k of the aperture member 22, and the other end is fitted into the side end portion of the driven arm portion 19c of the lock shaft 19 and supported. A hook portion 20b of the urging spring 20 is suspended on a projection 22j of the aperture member 22, and a hook portion 20a is suspended on the driven arm portion 19c of the lock shaft 19. Consequently, the urging spring 20 can urge the lock shaft 19 both in the +Z direction and in the clockwise direction.

Figure 14:
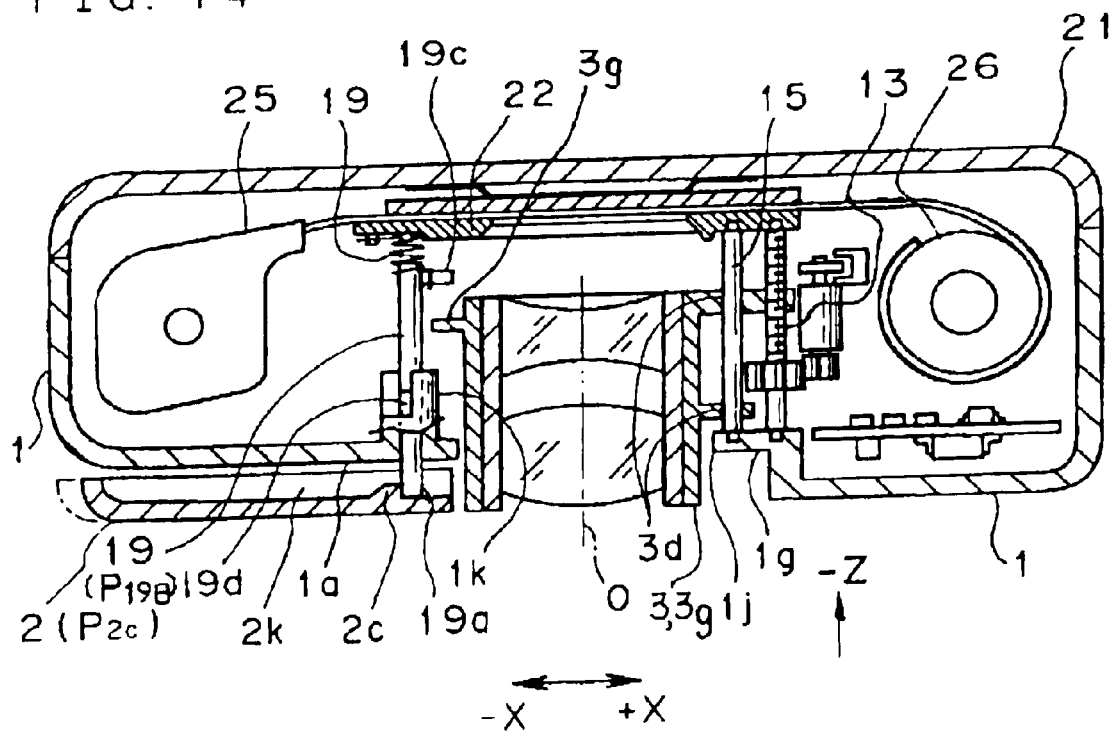
FIG. 14 is a cross-sectional view taken along B—B of FIG. 1, in which shows the barrier is located at the semi-open position and the lens barrel starts to retract in the camera main body.
Figure 15:
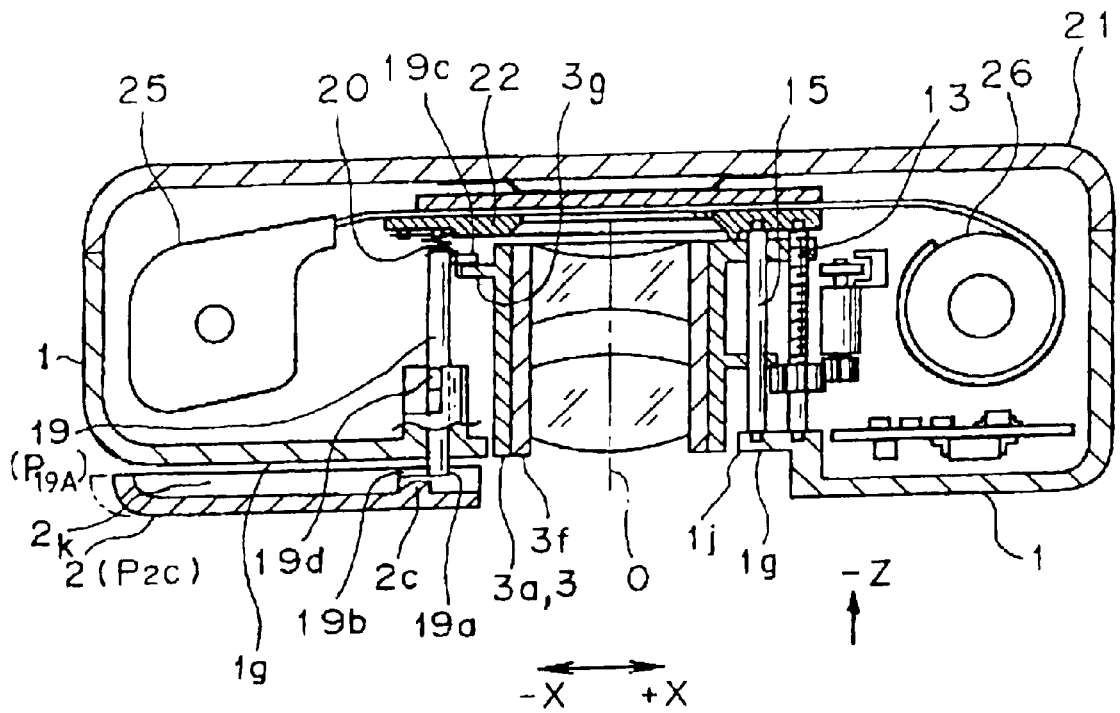
FIG. 15 is a cross-sectional view taken along B—B of FIG. 1, in which the barrier is located at the semi-open position and the lens barrel has just retracted in the camera main body.

The lock shaft 19 is fitted in the shaft hole 11 of the bearing portion (shaft receiving portion) 1k so as to be rotatable and slidable in the Z direction. The tip portion 19a of the lock shaft 19 and the arm-portion tip 19b project outwardly from the shaft hole 1i of the camera main body 1. Accordingly, the lock shaft 19 is installed so as to be movable between the lock (fixing) position P19B (FIGS. 13, 14) and the lock (fixing) release position P19A (FIG. 15).

When the lock shaft 19 is located at the lock position P19B, the projecting portion 2c of the barrier 2 is able to abut against the tip portion 19a of the lock shaft 19, and the movement of the barrier 2 in the closing direction (+X direction) is prevented. When the lock shaft 19 is retracted at the lock release position P19A, the projection 2c of the barrier 2 and the tip portion 19a of the lock shaft 19 do not interfere with each other and thus the movement of the barrier 2 in the closing direction is allowed.

When the lock shaft 19 is located at the lock position P19B, the lock shaft 19 is kept in the rotation-limited state while the rotational stop projecting portion 19d abuts against the notch 1q of the bearing portion 1k, and the position of the lock shaft 19 in the axial direction is determined because the front end surface of the tip portion 19a abuts against the inner (wall) surface 2e of the barrier 2. The positioning of the lock shaft 19 in the Z direction at the lock position P19B may be achieved by other means, for example, by making the rotational stop projecting portion 19d abut against the bottom portion of the notch 1q.

The driven arm portion 19c of the lock shaft 19 is one of the constituent elements of the lock release mechanism. It abuts against the driving projection 3g of the lens barrel 3 when the lens barrel 3 is retracted and is pressed in the −Z direction, whereby the lock shaft 19 is backwardly moved (retracted) to the lock release position P19A.

Figure 16:
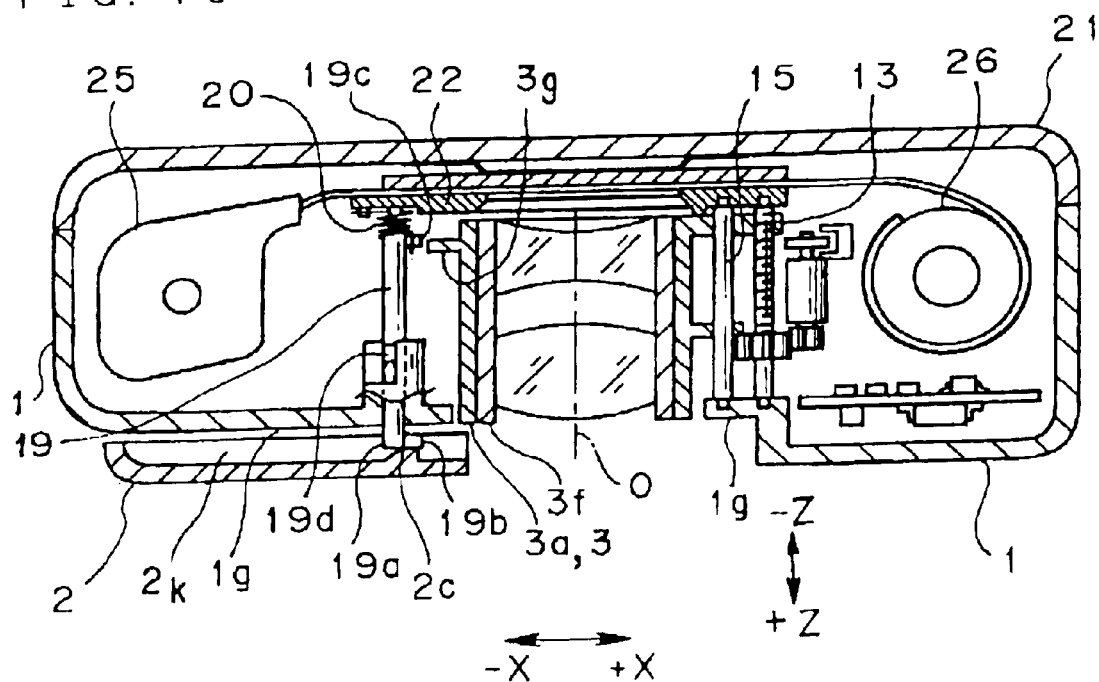
FIG. 16 is a cross-sectional view taken along B—B of FIG. 1, in which the lens barrel has retracted and the barrier has further moved in the closing direction from the semi-open position.

When the lock shaft 19 is located at the lock release position P19A, the arm-portion tip 19b of the lock shaft 19 is allowed to be pressed by the tip face of the rib portion 2k of the barrier 2. When the arm-portion tip 19b of the lock shaft 19 is pressed by the rib portion 2k, the lock shaft 19 is rotated counterclockwise by substantially 90° (FIG. 7B). By the counterclockwise rotation of the lock shaft 19, the engagement between the driven arm portion 19c and the driving projection portion 3g of the lens barrel 3 is released, and the lock shaft 19 is set to the lock standby state (lock-ready state) (FIGS. 7B, 16). The lock standby state of the lock shaft 19 corresponds to a state where the lock shaft 19 is moved in the +Z direction by the urging force of the urging spring 20, and the tip portion 19a of the lock shaft 19 abuts against the inner surface 2e of the barrier 2. Because the lock shaft 19 is kept in the lock standby state under the barrier closed state, when the barrier 2 is moved to the semi-open position P2C, the lock shaft 19 further advances and moves to the lock position P19B in the +Z direction urged by the urging spring 20, thereby locking the barrier 2.

When the lock shaft 19 is located at the lock position P19B, the arm-portion tip 19b is released from the rib portion 2k of the barrier 2. Further, under the state that the lens barrel 3 is retracted, the driven arm portion 19c of the lock shaft 19 is located in front of (+Z side) of the driving projection portion 3g of the lens barrel 3 as shown in FIG. 8A. When the lens barrel 3 is extracted from the state of FIG. 8A, a slant surface 3h of the driving projection portion 3g and a slant surface 19e of the driven arm portion 19c abut against each other (FIG. 8B), and the slant surface 3h of the driving projection portion 3g and the slant surface 19e of the driven arm 19c are slid along each other. Through this sliding motion, the driving projection portion 3g applies a force to the driven arm portion 19c through the slant surface 3h opposing the clockwise rotational urging force of the urging spring 20 suspended on the lock shaft 19, whereby the driving projection portion 3g lifts up the driven arm portion 19c (FIG. 8C) and the lock shaft 19 is temporarily rotated counterclockwise. Therefore, the driving projection portion 3g moves in front of the driven arm portion 19c (FIG. 8D). Thereafter, the photographic lens barrel 3 reaches the photographic standby position.

The configuration of a camera lens barrel controller serving as the driving control mechanism employing this embodiment of the present invention and a main electrical control circuit around each detecting switch portion will be described with reference to the electrical circuit diagram of FIG. 18.

The electrical control circuit of the camera employing this embodiment is powered by a battery 31 serving as a power source. A Central Processing Unit (CPU) 32 controls operation of the electrical control circuitry of the camera. A driver 33 drives the driving motor 11 and is controlled by CPU 32. The driving motor 11 moves the lens barrel 3 forwardly and backwardly.

CPU 32 may receive an ON-signal from the barrier detecting switch 1c detecting that the barrier 2 is open, and then starts the extraction of the lens barrel 3. CPU 32 may receive an OFF-signal from the barrier detecting switch 1c detecting the start of the closing operation of the barrier 2, and then starts the retraction of the lens barrel 3. CPU 32 receives the output signals from the retracted position detecting switch 34a and the photographing standby position (photographic position) detecting switch 34b installed in the camera main body 1 and detects the forward or backward movement (advance/retraction) state of the lens barrel 3. Further, when the lens barrel 3 is located at the photographic standby position, and CPU 32 receives the output signal from the release switch 10a driven by the release button 10, CPU 32 starts the sequence for the photographing operation.

Figure 17:
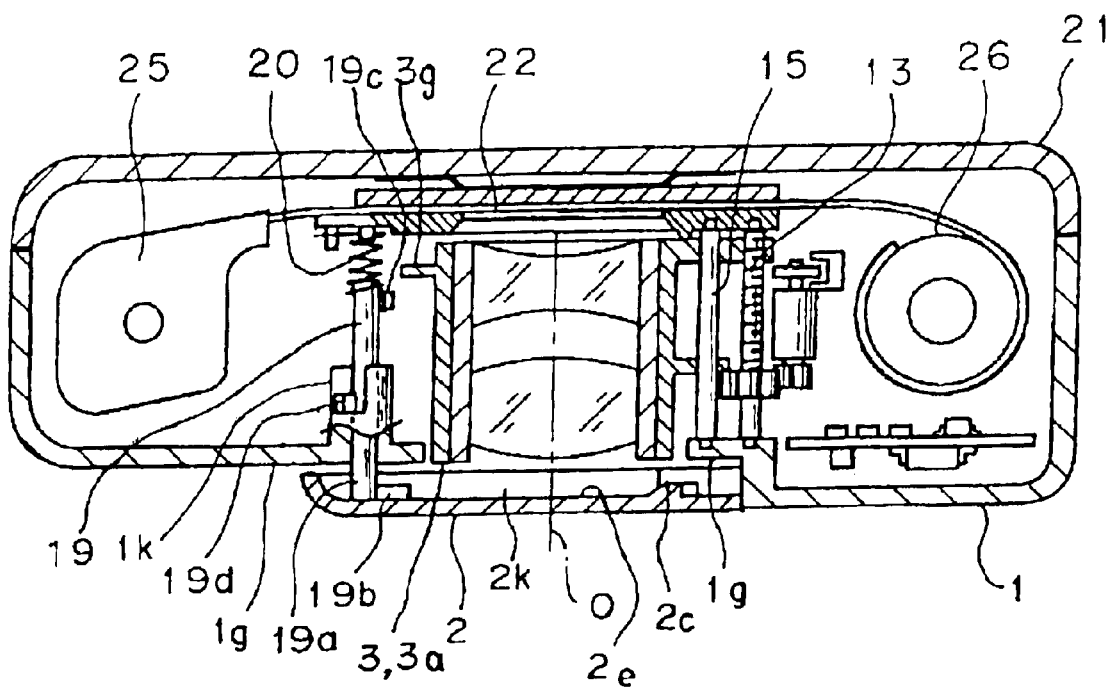
FIG. 17 is a cross-sectional view taken along B—B of FIG. 1, in which the barrier has closed.

Next, the forward and backward moving operations (advance/retraction operation) of the lens barrel 3 in connection with the barrier opening and closing operation of the camera of the embodiment will be described with reference to the front views of the camera in FIGS. 9 to 12 and the cross-sectional views of the camera in FIGS. 13 to 17. FIGS. 9 and 13 show the state in which the lens barrel 3 is extracted to the photographic standby position and the barrier 2 is in the open state. FIGS. 10 and 14 show the state in which the barrier 2 is in the semi-open position and the lens barrel 3 has just started to move from the photographic standby position to the retracted position. FIG. 15 shows the state in which the barrier 2 is a semi-open position and the retracting operation of the lens barrel 3 has completed. FIGS. 11 and 16 show the state that the barrier 2 is further moved in the closing direction from the semi-open position after the lens barrel 3 has retracted to the retracted position. FIGS. 12 and 17 shows the state that the barrier 2 has moved to the closed position and the lens barrel 3 has been located at the retracted position.

When the camera is in the non-photographic state, the lens barrel 3 is positioned in the retracted position as shown in FIGS. 12 and 17, and the lens barrel 3 has retreated from the moving path of the barrier 2. Further, the barrier 2 is located at the closed position P2A and the front face of the lens barrel 3 is completely covered by the barrier 2.

When the barrier 2 is located at the closed position P2A, the lock shaft 19 is set to the rotated state such that the arm-portion tip 19b abuts against the upper surface of the rib portion 2k of the barrier 2 as shown in FIG. 7B. Under this state, the driven arm portion 19c is released from the abutting state under which it abuts against the driving projection portion 3g of the lens barrel 3, and the tip portion 19a is held in the lock standby state (engaging standby state) under which the tip portion 19a abuts against the inner surface 2e of the barrier 2.

In order to set the camera from the non-photographic state shown in FIGS. 12, 17 to the photographic standby state shown in FIGS. 9, 13, the barrier 2 is manually slid in the −X direction so that it passes over the semi-open position P2C at which it is retreated from the front face of the photographic lens 3e and reaches the open position P2B. Both the semi-open position P2C and the open position P2B are within the range of the retreated position in which the barrier 2 has retreated enough so as not to disturb the extraction of the photographic lens 3e.

During the movement of the barrier 2 in the open direction, the tip portion 19a of the lock shaft 19, which is in the lock standby state, is slid on the inner surface 2e of the barrier 2 while it is pressed on the surface by the urging force of the urging spring 20. When the barrier 2 reaches at the semi-open position P2C or passes the position, after the tip portion 19a of the lock shaft 19 has passed over the slant surface 21 of the projection 2c, the tip portion 19a of the lock shaft 19 under the lock standby state just jumps to the +X (right) side of the projection 2c to locate in the lock position P19B (FIGS. 7A, 13, 14). At this time point, the lock shaft 19 is set to the lock state (locking state) under which it fixes the barrier 2. The lens barrel 3 has still been kept at the retracted position of FIG. 17. In this state, the barrier 2 is located outside of the moving path of the lens barrel 3, and the lens barrel 3 is ready to be extracted. Since the lock shaft 19 is located at the lock position P19B, the barrier 2 is prevented from being moved in the closing direction by the tip portion 19a of the lock shaft 19.

When the lock shaft 19 is moved to the lock position P19B under the state where the barrier 2 is located at the semi-open position P2C, the arm-portion tip 19b of the lock shaft 19 is also released from the rib portion 2k of the barrier 2, so that the lock shaft 19 is clockwise rotated by the urging force of the urging spring 20, and the driven arm portion 19c is set to be located at the +Z side of the driving projection portion 3g of the lens barrel 3 (FIG. 8A).

When the barrier 2 is moved to the open position P2B, the output of the barrier detecting switch 1c is switched on by the barrier projection 2d (FIG. 9). The ON-signal is input to CPU 32, and the driving motor 11 is driven under the control of CPU 32, so that the lens barrel 3 starts its extraction to the photographic standby position. When the lens barrel 3 is extracted, the lens barrel 3 is located within the moving path of the barrier 2.

In this embodiment, the barrier 2 is locked at the semi-open position P2C, and then the extraction of the lens barrel 3 is started when the barrier 2 is at the open position. However, as long as the barrier 2 is located in the range of the retreated position, the position at which the barrier 2 is locked can be set to be the same position at which the extraction of the lens barrel 3 is started. However, if these positions are different from each other as in the case of the above-described embodiment, the extraction of the lens barrel 3 is started after the lock of the barrier 2 has been surely finished, and thus this embodiment is more advantageous in operation stability.

During the extracting operation of the lens barrel 3, the driving projection portion 3g of the lens barrel 3 changes its positional order to the driven arm portion 19c (moves to the front of the driven arm portion 19c from behind it) and thus locates in front of the driven arm portion 19c by pushing aside the driven arm portion 19c of the lock shaft 19 located in the front side of the driving projection portion 3g (+Z side).

Even if the barrier 2 is carelessly pushed in the closing direction during the extraction of the lens barrel 3, the barrier 2 cannot be moved from the semi-open position P2C in the closing direction because the lock shaft 19 has been moved to the lock position P19B as described above, and thus the lens barrel 3 is protected from the barrier 2.

When the lens barrel 3 is to be retracted and set to the non-photographing state, after the photographing operation state shown in FIGS. 9, 13 is over, the barrier 2 is manually slid in the +X direction by a slight amount as shown in FIGS. 10, 14 which switch the barrier detecting switch 1c to the OFF-state. At this time, the barrier 2 is locked at the semi-open position P2C by the tip portion 19a of the lock shaft 19 located at the lock position P19B (FIG. 7A). Consequently, the barrier 2 is kept out of the moving path of the lens barrel 3, and the closing side end face 2f of the barrier 2 is not brought into contact with the lens barrel 3.

The projection 2d of the barrier 2 is separated and released from the contact piece 1e of the barrier detecting switch 1c through the closing movement of the barrier 2, so that CPU 32 receives the off-signal from the barrier detecting switch 1c. By this signal, CPU 32 controls the driving of the driving motor 11 to start the retracting operation of the lens barrel 3 in the retraction direction. This embodiment is designed so that the barrier detecting switch 1c is switched off as soon as the barrier 2 is moved to the semi-open position P2C thus enhancing operational and providing a smooth feeling.

The driving projection portion 3g of the lens barrel 3 comes into contact with the driven arm portion 19c of the lock shaft 19 and presses the driven arm portion 19c in the −Z direction around the end of the retraction operation of the lens barrel 3. This pressing movement releases the engaging between the tip portion 19a of the lock shaft 19 and the projection 2c of the barrier 2, and the lock shaft 19 is moved to the lock release position P19A (FIG. 15). At this time, the lock shaft 19 is set to the non-lock state (non-fixed state) under which the locking of the barrier 2 is forcibly released, whereby the barrier 2 is allowed to be moved in the closing direction. At this time, the lens barrel 3 arrives at the retraction position (FIG. 15).

The arrival of the lens barrel 3 at the retraction position causes the retraction position detecting switch 34a to output an ON-signal. The ON-signal output from the retraction position detecting switch 34a is input as a retraction position arrival signal at CPU 32, so that the retraction of the lens barrel 3 is stopped and CPU 32 is set to the stopped state.

When the lens barrier is retracted to the retraction position, it is located out of the moving path of the barrier 2. Since the lock shaft 19 is located at the lock release position P19A, the barrier 2 is able to be manually slid from the semi-open position P2C to the closed position P2A in the +X direction. However, even when this sliding motion is carried out, the barrier 2 does not interfere with the lens barrel 3.

When the barrier 2 is being closed from the semi-open position P2C in the closing direction, the arm-portion tip 19b of the lock shaft 19 is pressed by the end face of the rib portion 2k of the barrier 2 with the above closing operation, and the lock shaft 19 is counterclockwise rotated against the rotational urging force of the urging spring 20 (FIG. 7B or FIGS. 11, 16). Since the engagement between the driven arm portion 19c and the driving projection portion 3g of the lens barrel 3 is released through the rotation of the lock shaft 19, the lock shaft 19 is set to the lock standby state (engagement standby state) in which the lock shaft 19 is urged in the +Z direction by the urging force along the axial direction. In this case, the tip portion 19a of the lock shaft 19 abuts against the projection 2c of the barrier 2 or the inner surface 2e of the barrier 2 in the neighborhood of the −Z side of the projection 2c (FIG. 16).

During the subsequent movement of the barrier 2 to the closed position P2A, the arm-portion tip 19b of the lock shaft 19 is sliding along the upper surface of the rib portion 2k of the barrier 2 (FIG. 7B), and the lock standby state of the lock shaft 19 is unchanged. Further, during the movement of the barrier 2 to the close position P2A, the tip portion 19a of the lock shaft 19 is slid on the inner surface 2e of the barrier 2.

When the barrier 2 reaches the closed position P2A, the front face of the lens barrel 3 is covered by the barrier 2 and the camera is set to the non-photographing state. Thereafter, to set the camera in the photographing standby state again, the barrier 2 is slid in the opening direction and the extraction of the lens barrel 3 shown in FIGS. 9, 13, etc. is executed.

Next, the photographic processing control operation which includes the lens barrel driving control in connection with the opening or closing operation, will be described with reference to the flowchart of FIG. 19.

Figure 19:
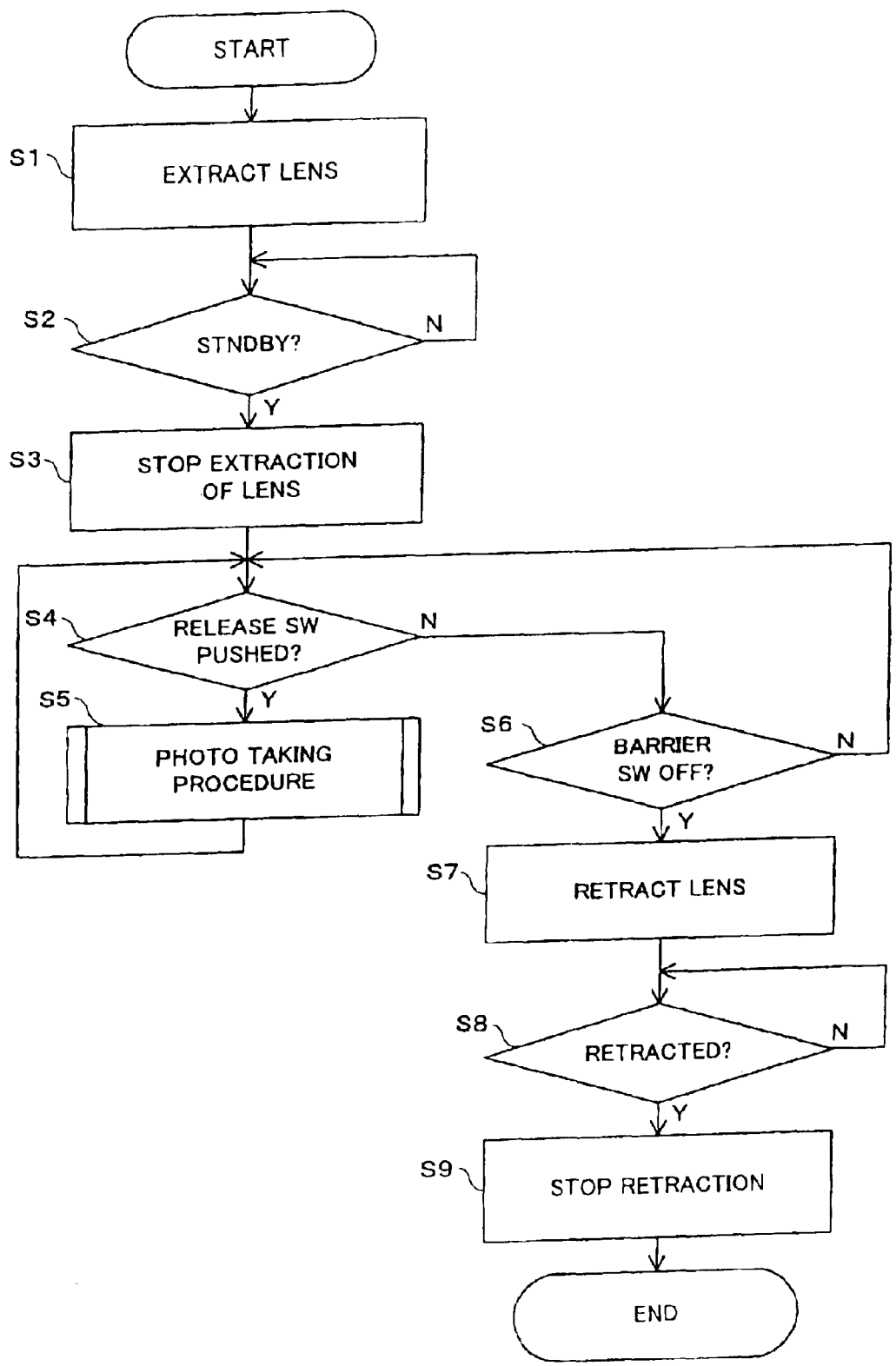
FIG. 19 is a general flowchart showing the operation of the camera.

FIG. 19 is a general flowchart showing the photographic processing including the photographic lens barrel driving control in connection with the opening or closing operation of the barrier of the camera according to this embodiment of the present invention.

When the barrier 2 is manually moved from the closed state to the open position P2B, the contact pieces 1d, 1e of the barrier detecting switch 1c are brought into contact with each other which turns on the barrier detecting switch 1c.

Figure 18:
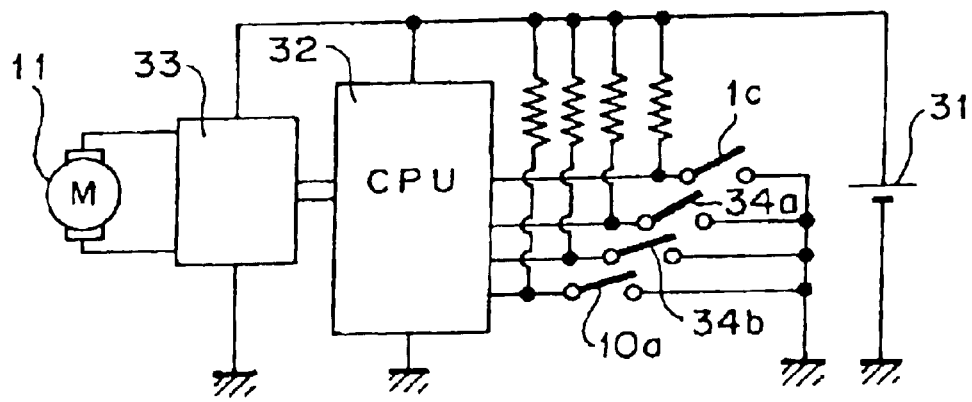
FIG. 18 is a diagram showing a main electrical control circuit of the camera of FIG. 1.

The lens barrel driving operation and the photographic processing under the control of CPU 32 shown in FIG. 18 are started on the basis of the ON-signal output from the barrier detecting switch 1c.

In step S1, CPU 32 transmits a driving signal to the motor driver 33, and the photographic lens barrel 3, which has been retracted in the camera is extracted to the photographic standby position (photographic position) by the driving motor 11. In step S2, CPU 32 checks whether the lens barrel 3 is located at the photographic standby position (lens initial position), for example, it arrives at a zoom wide end position. When the photographing standby position detecting switch 34b detects that the lens barrel 3 has arrived at the photographic standby position, the driving motor 11 is turned off in step S3 to stop the extraction of the lens barrel 3.

Thereafter, the processing goes to step S4 and the release switch 1a checks whether the release button 10 is being operated. When the switch 10a is turned on, the processing goes to step S5 and the photographic sequence processing of CPU 32 is executed.

When it is detected by the check of the step S4 that the release switch 10a is turned off, the processing jumps to step S6 to check whether the barrier detecting switch 1c of the barrier 2 is turned on or off. If it is detected that the barrier detection switch 1c is turned off (that is, when the barrier 2 is manually moved in the close direction), the processing goes to step S7 to drive the lens barrel 3 in the retracting direction (−Z direction).

In step S8, it is checked on the basis of the output signal of the retraction position detecting switch 34a whether the lens barrel 3 has reached the retraction position. If it is judged that the lens barrel 3 has arrived at the retraction position, the processing goes to step S9 to stop the driving of the lens barrel 3, and this routine is finished.

According to the camera of this embodiment of the present invention, during the retraction operation of the lens barrel 3 to the retraction portion or when the lens barrel 3 is extracted to the photographic standby position, the barrier 2 is locked at the semi-open position P2C by the lock shaft 19 located at the lock position P19B. Therefore, even when the barrier 2 is pressed in the closing direction (+X direction), the barrier 2 will not abut against the lens barrel 3.

Figure 20:
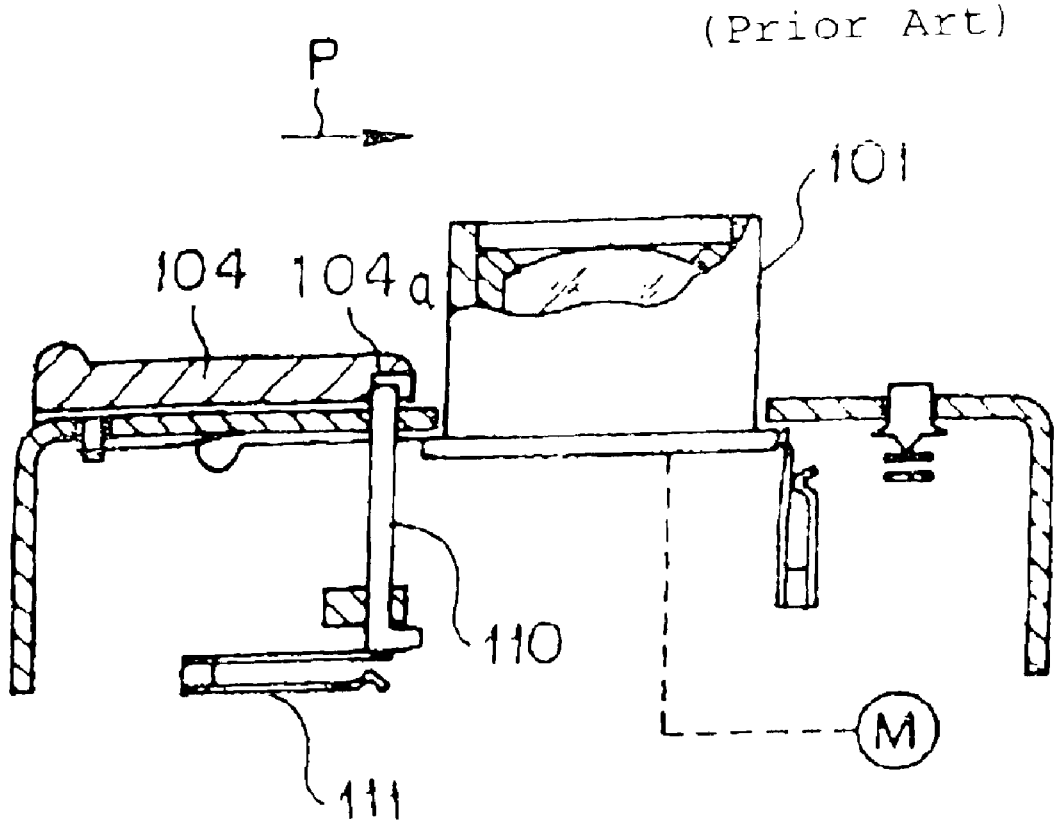
FIG. 20 is a cross-sectional view of the main portion around the lens barrel under the barrier locked state of the prior art camera.

Particularly in the camera of this embodiment of the present invention, when the camera is under the non-photographic state, the lock shaft 19 has been already set to the lock (fix) standby state. Consequently, in the case where the barrier 2 is moved from the closed position P2A in the open direction in order to switch the camera from the non-photographic state to the photographic state (photographic standby state), the lock shaft 19 is moved from the lock standby state to the lock (fix) position P19B immediately after the barrier 2 arrives at the semi-open position P2C. Immediately after that, the barrier 2 is surely locked (fixed) at the semi-open position P2C by the lock shaft 19 even when the barrier 2 is carelessly pushed in the closing direction. Consequently, the contact between the lens barrier and the lens barrel just after the open operation of the barrier by unintentionally pushing the barrier, as happened in the prior art shown in FIG. 20, can be effectively prevented.

As described above, according to the present invention, in a camera having a lens barrier which can be opened and closed in front of a moveable lens barrel, damages of the lens barrel or a mechanism for driving the lens barrel caused by unintentional operation of the barrier are effectively decreased.

What is claimed is:

1. A camera, comprising:
   a photographic lens barrel having a lens moving path along which said photographic lens barrel is movable between a photographing-possible position and a photographing-impossible position;
   a barrier having a barrier moving path along which said barrier is movable between a closed position at which said photographic lens barrel is covered by said barrier and a retreated position at which said barrier is retreated from the front face of said photographic lens barrel, and which said barrier moving path crosses the lens moving path of said photographic lens barrel;
   a lock member that is movable to a lock release position so that said barrier is allowed to move to the closed position by using the movement of said photographic lens barrel to the photographing-impossible position, and movable to a lock position to prevent the movement of said barrier in the closing direction when said barrier is located at the retreated position;
   a lock engaging portion, by engaging with the lock member, that starts movement of said lock member from the lock release position toward the lock position by using a manual closing operation of said barrier;
   a photographic lens barrel driving portion for driving said photographic lens barrel between the photographing-possible position and the photographing-impossible position;
   a lock release engaging portion for moving said lock member from the lock position in a lock releasing direction using the movement of said photographic lens barrel to the photographing-impossible position by said photographic lens barrel driving portion; and
   an urging member, wherein said lock member is a rod-shaped member that is rotatable and movable in the axial direction, and said lock member is driven from the lock release position to the lock position by said urging member, said lock member is rotated against the urging force of said urging member through the engagement with said lock engaging portion, and moves in the axial direction from the lock release position to the lock position.

2. The camera as claimed in claim 1, wherein said urging member consists of a single urging member, said urging member urges the lock member in one rotational direction around the axis of the lock member and in one axial direction of the lock member.

3. The camera as claimed in claim 1, wherein said lock member is equipped with a lever portion at one end thereof, and said lever portion is rotatable against the urging force of said urging member by abutting against a rib provided on said barrier.

4. The camera as claimed in claim 1, wherein said lock member has an abutting portion that is to abut against said photographic lens barrel, the abutting portion, by abutting against said photographic lens barrel, drives the lock member to the lock release position by using the movement of said photographic lens barrel to the photographing-impossible position.

5. A camera, comprising:
   a photographic lens barrel having a lens moving path along which said photographic lens barrel is movable between a photographing-possible position and a photographing-impossible position;
   a barrier having a barrier moving path along which said barrier is movable between a closed position at which said photographic lens barrel is covered by said barrier and a retreated position at which said barrier is retreated from the front face of said photographic lens barrel, and which said barrier moving path crosses the lens moving path of said photographic lens barrel;

a lock member which is relatively moved to a lock position to prevent said barrier from being moved in a closing direction when said barrier is moved to the retreated position, and moved from the lock position to a lock release position to allow movement of said barrier in the closing direction by using a retraction operation of said photographic lens barrel; and a lock engaging portion that is to engage to said lock member and starts movement of said lock member from the lock release position toward the lock position using the closing operation of said barrier to cover said photographic lens barrel.

6. The camera as claimed in claim 5, wherein when said lock member is located at the lock position, said lock member is retreated from the lens moving path of said photographic lens barrel so as not to disturb the movement of said photographic lens barrel in the middle of the movement of said photographic lens barrel from the photographing-impossible position to the photographing-possible position.

7. The camera as claimed in claim 5, further comprising an urging member, wherein said lock member is a rod-shaped member that is rotatable and movable in the axial direction, and said lock member is movable from the lock release position to the lock position by said urging member, the lock member is driven to rotate through the engagement to a lock engaging member against the force applied by the urging member and moves in the axial direction from the lock release position to the lock position.

8. The camera as claimed in claim 7, wherein said urging member consists of a single urging member, said urging member urges the lock member in one rotational direction around the axis of the lock member and in one axial direction of the lock member.

9. The camera as claimed in claim 7, wherein the lock member is equipped with a lever portion at one end thereof, and said lever portion is rotatable against the urging force of said urging member by abutting against a rib provided on said barrier.

10. The camera as claimed in claim 7, wherein the lock member has an abutting portion that abuts against said photographic lens barrel, and the abutting portion, by abutting to a lock release engaging portion provided on said photographic lens barrel, drives the lock member to the a lock release position by using the movement of said photographic lens barrel to the photographing-impossible position.

11. A camera, comprising:

a photographic lens barrel having a lens moving path along which said photographic lens barrel is movable between a photographing-possible position and a photographing-impossible position;

a barrier having a barrier moving path along which said barrier is movable between a closed position at which said photographic lens barrel is covered by said barrier and a retreated position at which said barrier is retreated from the front face of said photographic lens barrel, and which said barrier moving path crosses the lens moving path of said photographic lens barrel;

a lock member which is moved to a lock position to prevent said barrier from being moved in a closing direction when said barrier is moved to the retreated position, and moved from the lock position to a lock release position to allow movement of said barrier in the closing direction by using a retraction operation of said photographic lens barrel; and a lock release engaging portion, by engaging to the lock member, that starts movement of said lock member from the lock release position toward the lock position and locates the lock member at a lock standby position, by using a closing movement of the barrier to cover the lens barrel.

12. A camera, comprising:

a photographic lens that is retracted in a body under a non-photographing state and extracted from said body under a photographing state;

a barrier movable between a closed position at which said barrier covers the front face of said photographic lens when said photographic lens is retracted in said body and a retreated position at which said barrier does not obstruct an extraction of said photographic lens;

a lock member for locking a movement of said barrier located at the retreated position to the closed position, said lock member takes at least three states, (1) a locking state under which said lock member locks said barrier, (2) a lock-ready state under which said lock member does not lock said barrier and is to be automatically shifted to the locking state when said barrier is moved to the retreated position, and (3) a non-locking state under which said lock member is forcibly released;

a mechanism for shifting said lock member from the locking state to the non-locking state by using a retracting operation of said photographing lens into said body; and a mechanism for shifting said lock member from the non-locking state to the lock-ready state by using the movement of said barrier from the retreated position to the closed position.

13. A camera, comprising:

a photographic lens that is retracted in a body under a non-photographing state and extracted from said body under a photographing state;

a manual barrier movable in front part of said camera, the moving path of said manual barrier includes a closed position at which said manual barrier covers the front of said photographic lens retracted in said body and a retreated position at which said manual barrier does not disturb extraction of said photographic lens;

a lock member provided to said body of said camera, said lock member takes at least three states, (1) a locking state under which said lock member is engaged with said barrier by an urging force of a spring so that said manual barrier may not move from the retreated position in a closing direction, (2) a lock-ready state under which said lock member is not locking said manual barrier and is to be automatically engaged with said manual barrier by the urging force to shift to the locking state when said manual barrier comes to the retreated position in an opening operation of said manual barrier, and (3) a non-locking state under which an engagement between said lock member and said manual barrier is forcibly released by a force applied against the urging force and thus said manual barrier is not locked;

a lock release engaging portion for shifting said lock member from the locking state to the non-locking state after a retraction operation of said photographic lens makes the movement of said manual barrier from a retreated position to a closed position allowable, said lock release engaging portion is provided on said photographic lens and engages with said lock member and applies the force against the urging force by using the retraction operation of said photographic lens; and a lock engaging portion for shifting said lock member from the non-locking state to the lock-ready state, said lock engaging portion is provided on said barrier and engages with said lock member and drives said lock member to release the engagement between the lock release engaging portion and said lock member by using a moving operation of said manual barrier from the retreated position to the closed position.

14. The camera as claimed in claim 13, wherein an open position that is farther away from the closed position than the retreated position is provided in the moving path of said manual barrier, and said camera further comprises:

a switch for detecting whether said manual barrier is located at the open position or not;

a driving motor for retracting and extracting said photographic lens; and a controller for controlling said driving motor, the controller controls to extract said photographic lens from said body when said switch detects that said manual barrier is located at the open position, and controls to retract said photographic lens into said body when said switch detects that said manual barrier is out of the open position.

15. The camera as claimed in claim 13, further comprising a mechanism for preventing the interference between said lock release engaging portion and said lock member during the extraction of said photographic lens.

16. The camera as claimed in claim 15, wherein said mechanism has a slant surface on which said lock release engaging portion and said lock member abut each other when said photographic lens is extracted, and said lock member is moved by force directing other than the extracting direction of said photographic lens during the extraction of the photographic lens, which force is applied through the relative sliding movement of said lock release engaging portion and said lock member on the slant surface.

17. A method of changing lock state of a barrier of a camera, said camera includes: a photographic lens that is retracted in a body under a non-photographic state and extracted from said body under a photographic state;

a barrier movable between a closed position at which said barrier covers the front part of said photographic lens retracted in the body and a retreated position at which said barrier does not disturb an extraction of said photographic lens; and a lock member for locking a movement of said barrier to the closing position at the retreated position, said lock member takes at least three states, (1) a locking state under which said lock member locks said barrier, (2) a lock-ready state under which said lock member does not lock said barrier and said lock member is to be automatically shifted to the locking state when said barrier is moved to the retreated position, and (3) a non-locking state under which said lock member is forcibly released, and said method comprises: a step of shifting said lock member from the locking state to the non-locking state by using a retracting operation of said photographic lens into said body; and a step of shifting said lock member from the non-locking state to the lock-ready state by using the movement of said barrier from the retreated position to the closed position.

18. A method of changing lock state of a barrier of a camera, said camera including a photographic lens that is retracted in a body under a non-photographing state and extracted from said body under a photographing state;

a manual barrier movable in front part of said camera, a moving path of said manual barrier includes, a closed position at which said barrier covers the front of said photographic lens retracted in said body and a retreated position at which said barrier does not disturb extraction of said photographic lens;

a lock member provided to said body of said camera, said lock member takes at least the three states, (1) a locking state under which said lock member is engaged with said barrier by urging force of a spring so that said barrier may not move from the retreated position in a closing direction, (2) a lock-ready state under which said lock member is not locking the barrier and is to be automatically engaged with said barrier by the urging force to shift to the locking state when said barrier comes to the retreated position in a opening operation of said barrier, and (3) a non-locking state under which an engagement between said lock member and said barrier is forcibly released by a force applied against the urging force and thus said barrier is not locked;

a lock release engaging portion provided to said photographic lens; and a lock engaging portion provided to said barrier, and said method comprising:

engaging said lock release engaging portion and said lock member to each other by using a retracting operation of said photographic lens to apply the force against the urging force to said lock member, and shifting said lock member from the locking state to the non-locking state after the retracting operation of said photographic lens makes the movement of said barrier from the retreated position to the closed position allowable; and engaging said lock engaging portion and said lock member to each other by using a moving operation of said barrier from the retreated position to the closed position, moving said lock member, and shifting said lock member from the non-locking state to the lock-ready state by releasing an engagement between said lock release engaging portion and said lock member.

19. A method of changing a lock state of a barrier of a camera, the method comprising:

automatically locking said barrier by an urging force so as to prevent said barrier from moving in a closing direction from a retreated position when said barrier is moved to a retreated position where said barrier does not disturb an extraction of said photographic lens;

detecting arrival of said barrier at an open position, and starting the extraction of said photographic lens from said body;

detecting that said barrier is separated from the open position and starting retraction of said photographic lens into said body;

releasing the lock by using a retracting operation of said photographic lens after said photographic lens is retracted to a position at which said movement of the barrier is not disturbed, after starting retraction of said photographic lens; and releasing a lock impossible state of a lock member by using the movement of said barrier from the retreated position to the closed position, after releasing the lock, wherein the lock impossible state is a state in which the lock member is not able to automatically lock said barrier even when said barrier moved to the retreated position.

20. A camera, comprising:

a photographic lens that is forwardly and backwardly movable in the direction of the optical axis;

a barrier movable between a closed position at which said barrier covers the front part of said photographic lens under the state that said photographic lens is retracted, and a retreated position at which said barrier does not disturb a forward movement of said photographic lens;

a lock member for locking the movement of said barrier located at the retreated position at least in the close direction;

a switch for detecting whether said barrier is located at a predetermined position which is the retreated position or a position that is more widely opened than the retreated position;

a motor for driving said photographic lens;

a driving circuit for driving said motor on the basis of the detection result of said switch, the driving circuit drives the motor to extract said photographic lens when said switch detects that said barrier is moved to the predetermined position, and the driving circuit drives the motor to retract said photographic lens when said switch detects that said barrier is apart from the predetermined position in the closing direction;

a member provided on said photographic lens, said member engages with said lock member when said photographic lens is retracted, and pressing an engaging portion of said lock member through the movement of said photographic lens thereby release the lock; and an urging member for urging said lock member and automatically moving said lock member by the urging force when said barrier is moved from the closed position to the retreated position, thereby locking said barrier, wherein in a phase of opening said barrier and extracting said photographic lens, after said barrier is moved from the closed position to the retreated position, the lock member locks said barrier on or before a start of an extraction of said photographic lens, and in a chase of retracting said photographic lens and closing said barrier, said lock member releases the lock on or after said photographic lens is retracted to a position at which said photographic lens does not interfere with said barrier.

* * * * *